Oct. 25, 1938.   F. A. REECE ET AL   2,134,417
BUTTON SEWING MACHINE
Filed July 7, 1936   16 Sheets-Sheet 2
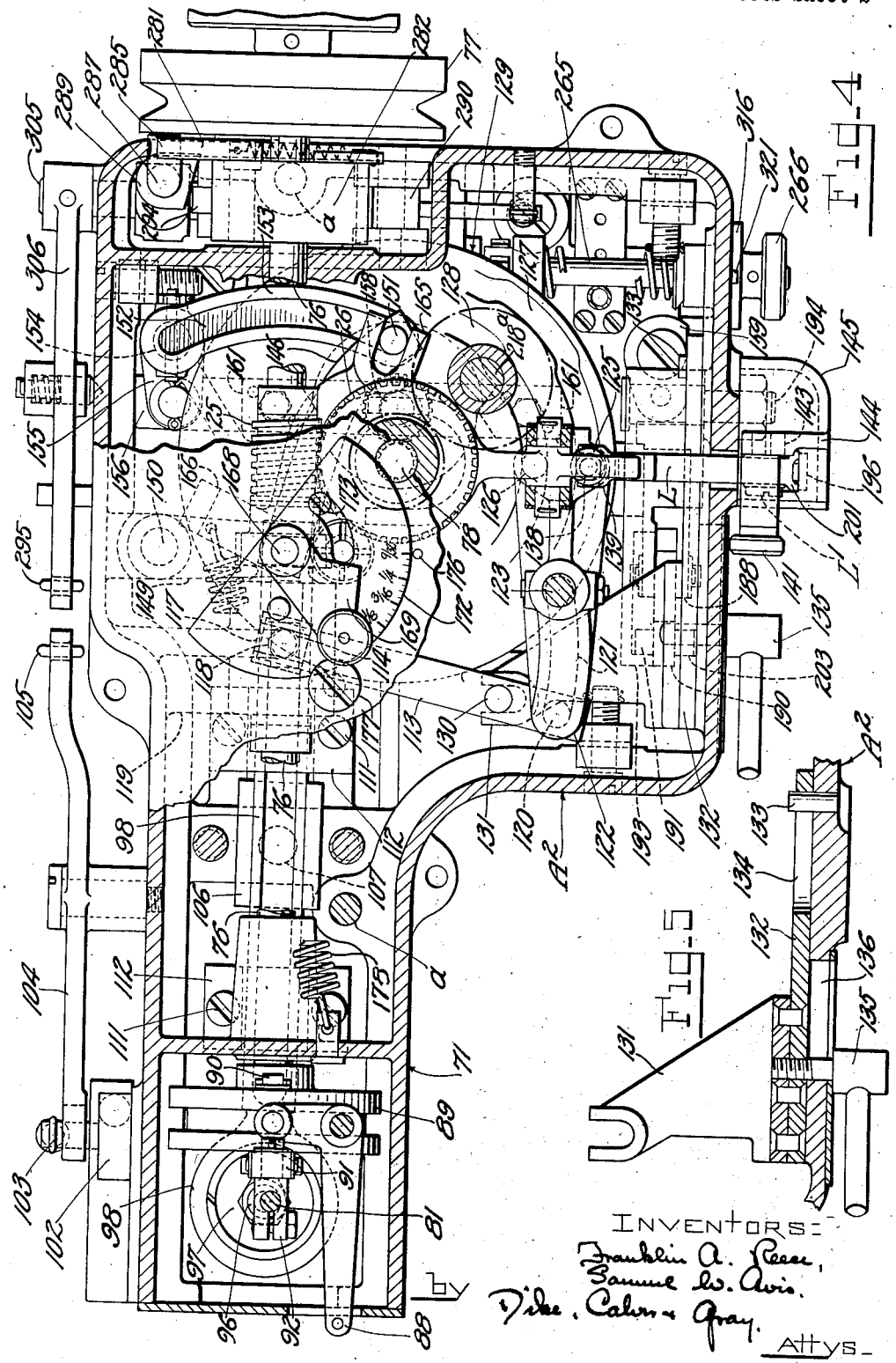

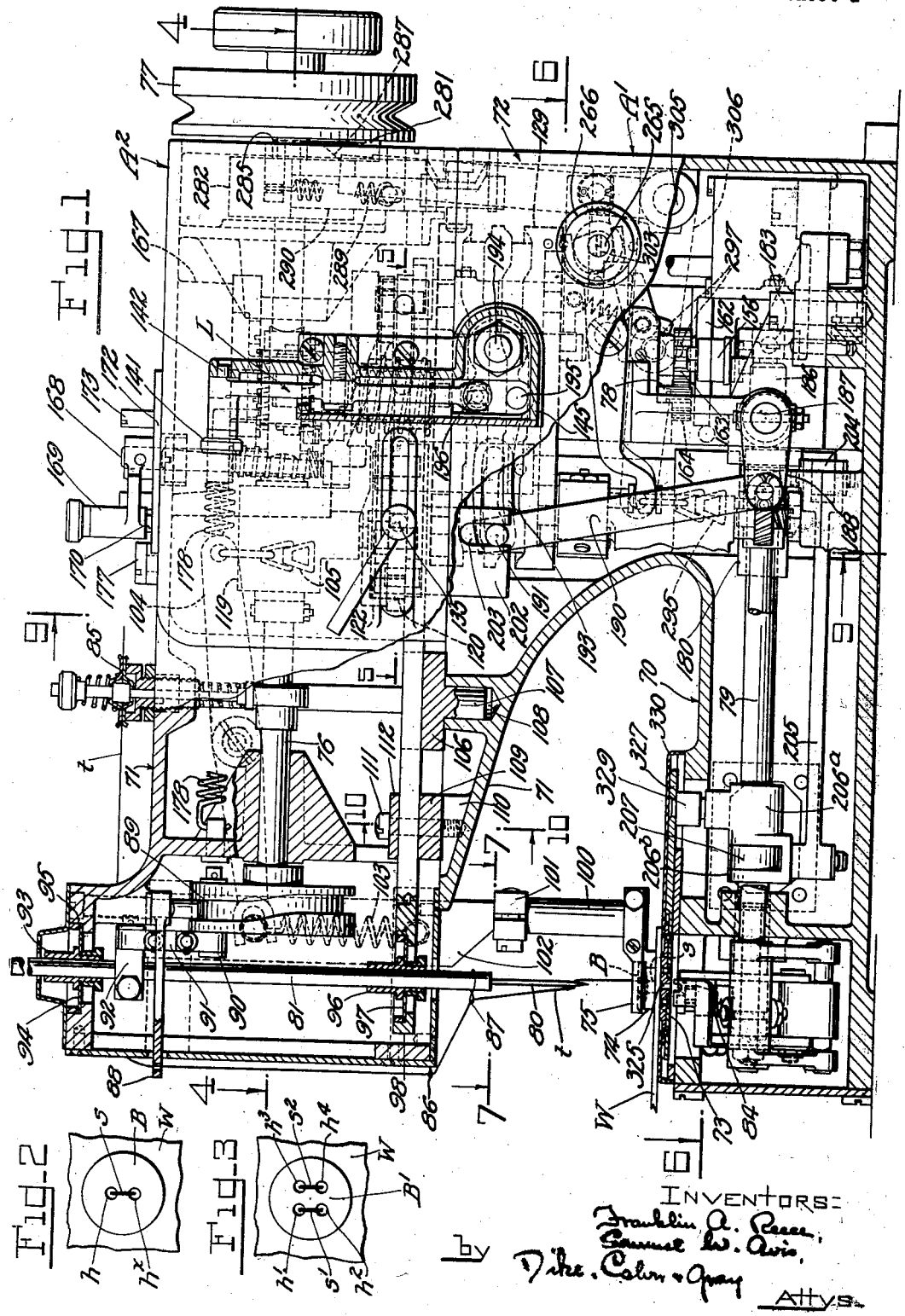

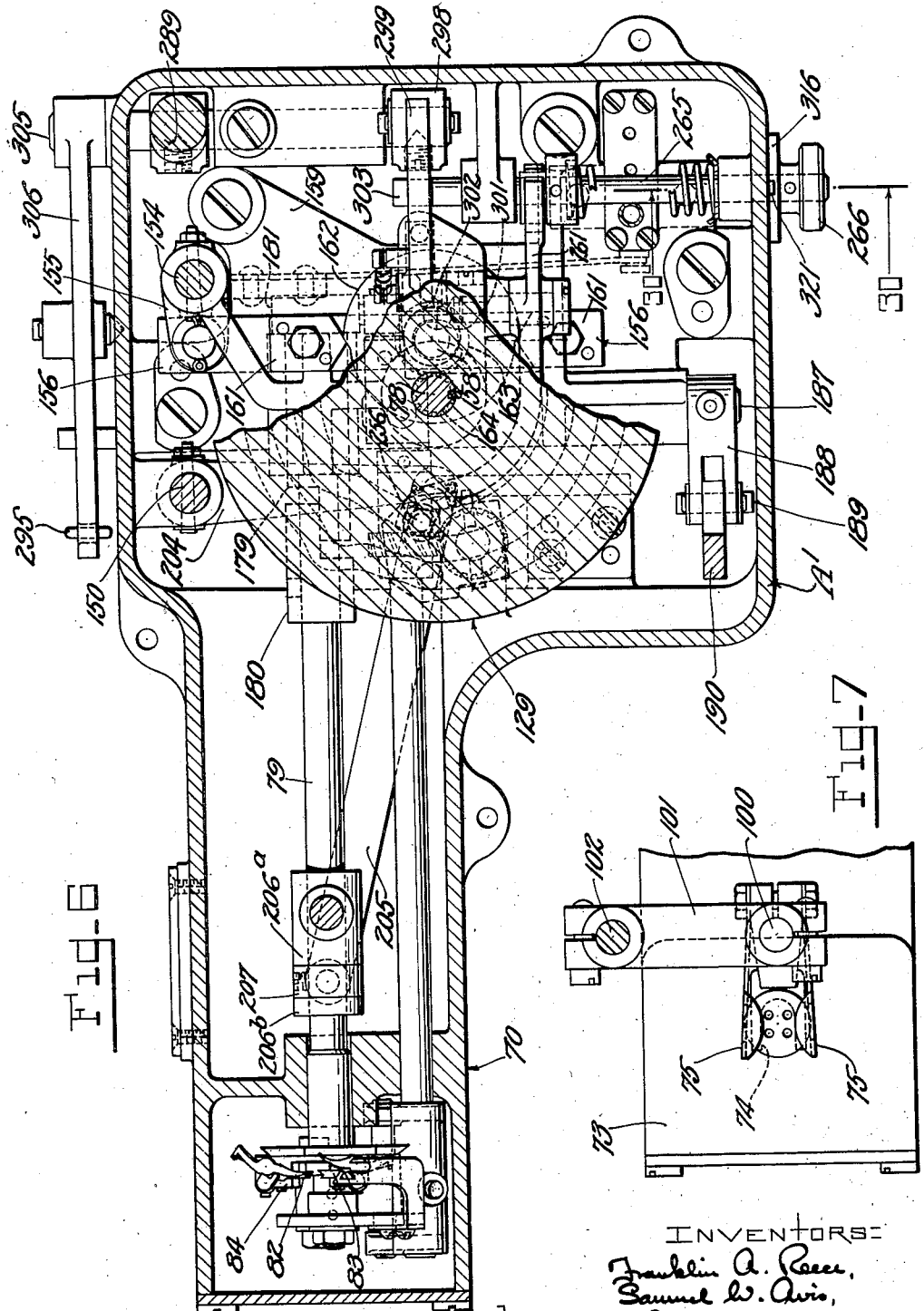

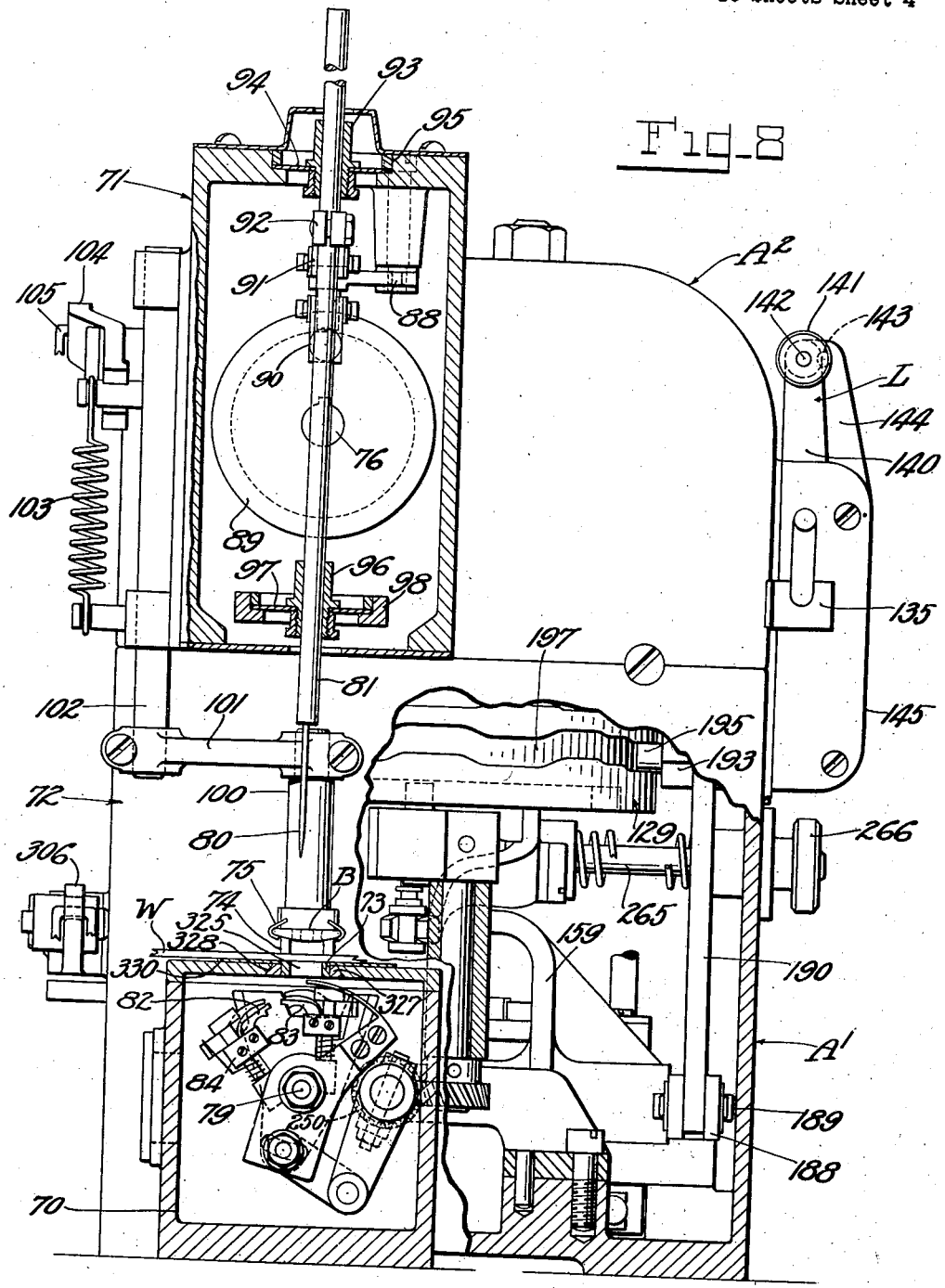

Oct. 25, 1938.  F. A. REECE ET AL  2,134,417
BUTTON SEWING MACHINE
Filed July 7, 1936  16 Sheets-Sheet 5
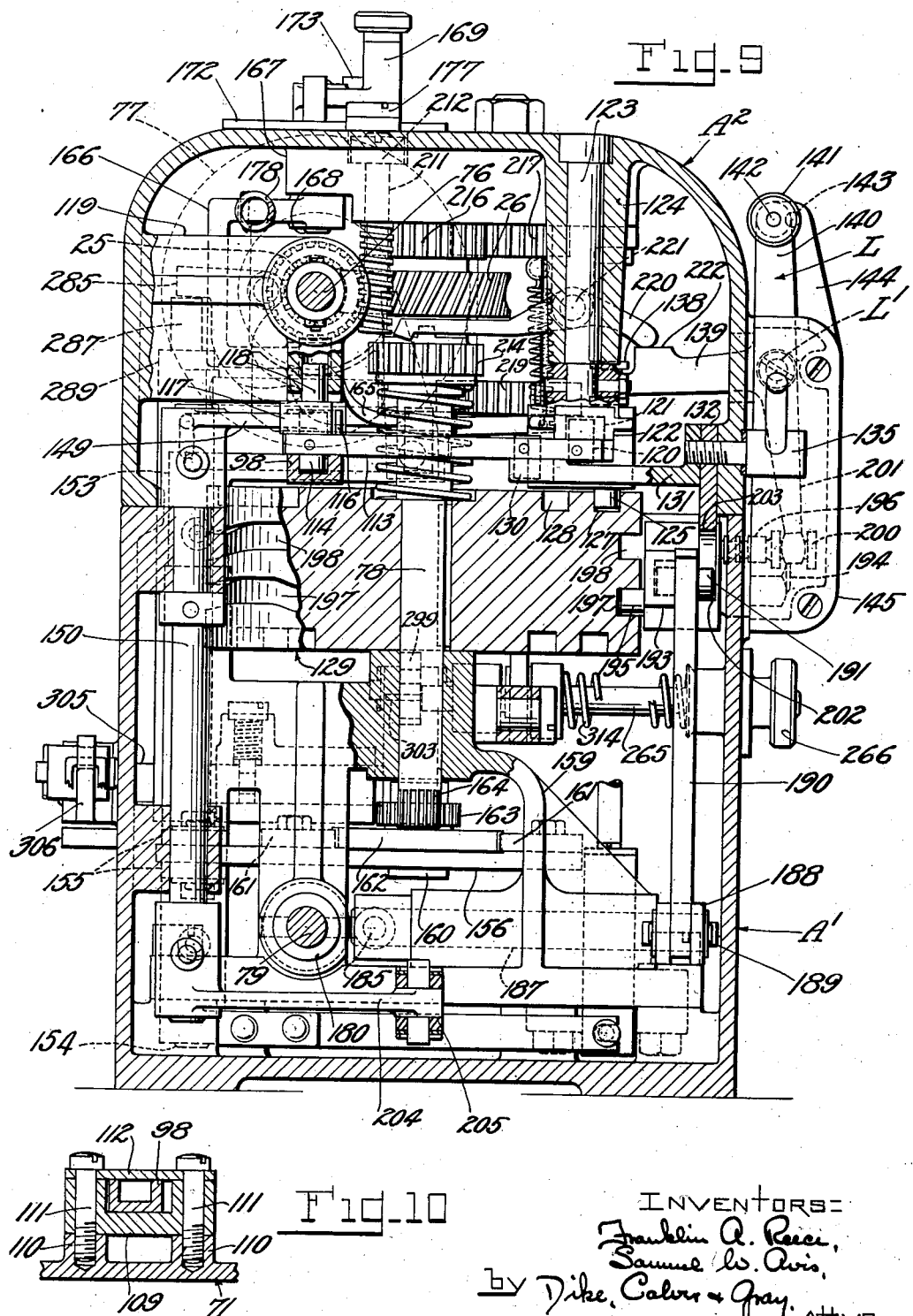

Oct. 25, 1938.　　F. A. REECE ET AL　　2,134,417
BUTTON SEWING MACHINE
Filed July 7, 1936　　16 Sheets-Sheet 6
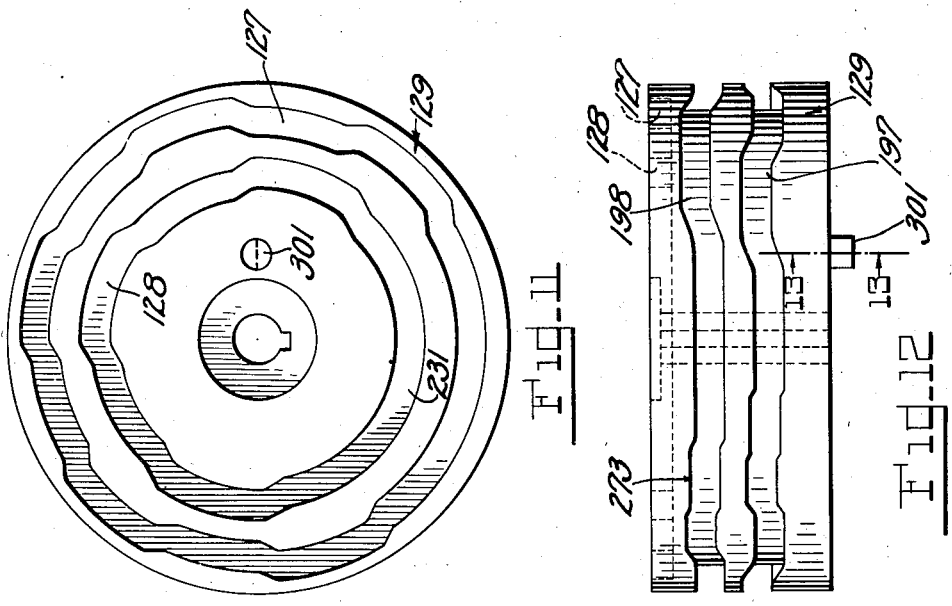
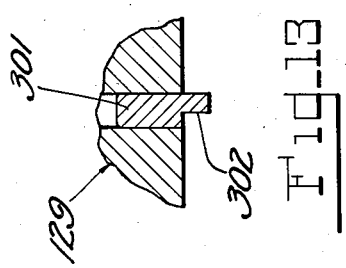
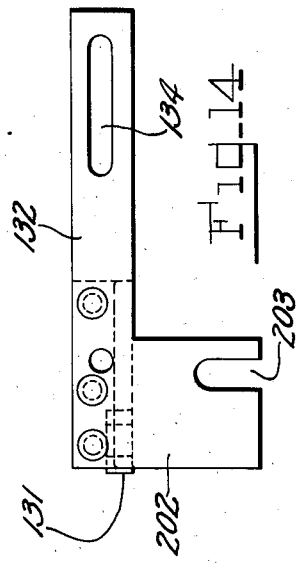
INVENTORS:
Franklin A. Reece,
Samuel W. Avis,
by Dike, Calver & Gray, Attys.

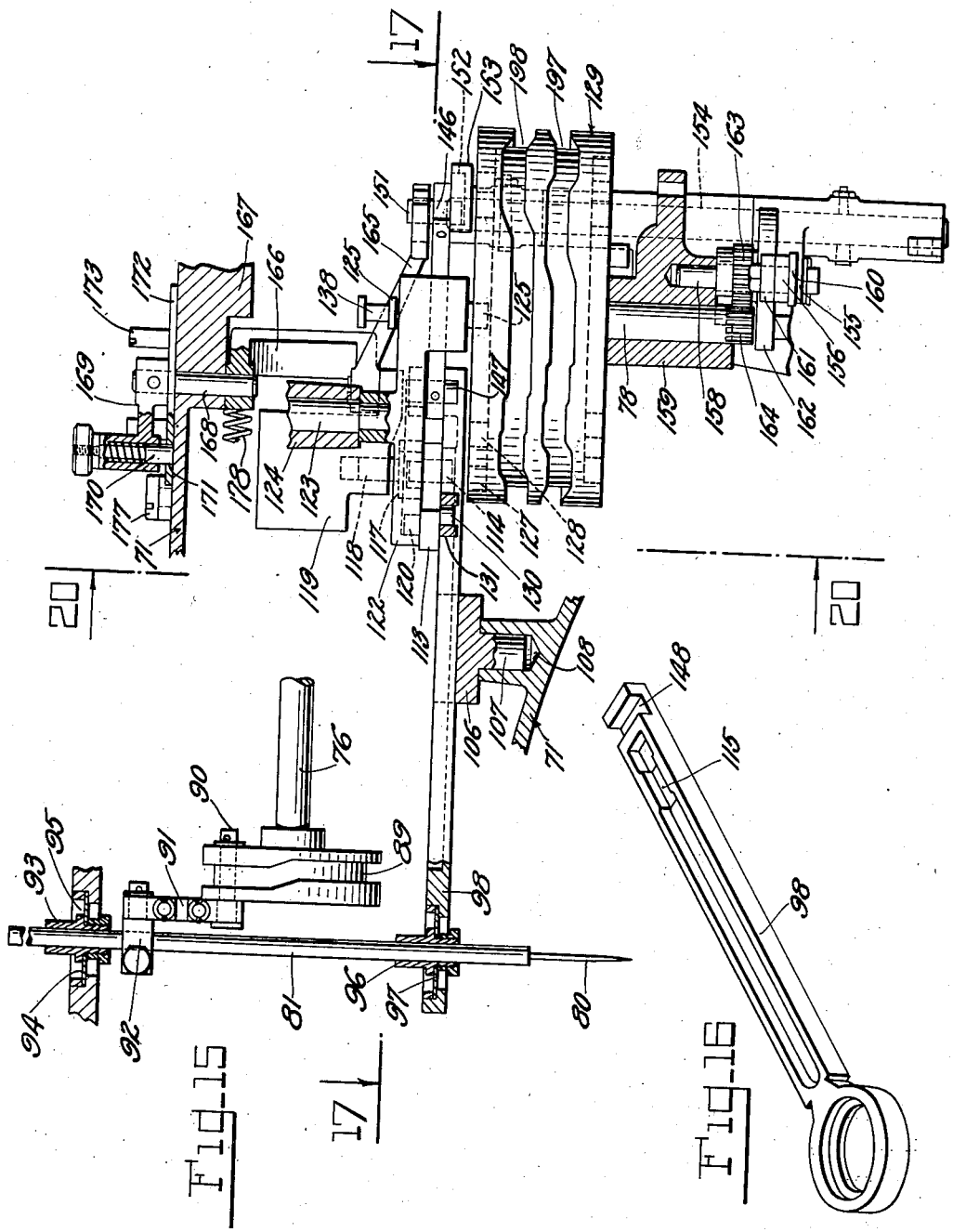

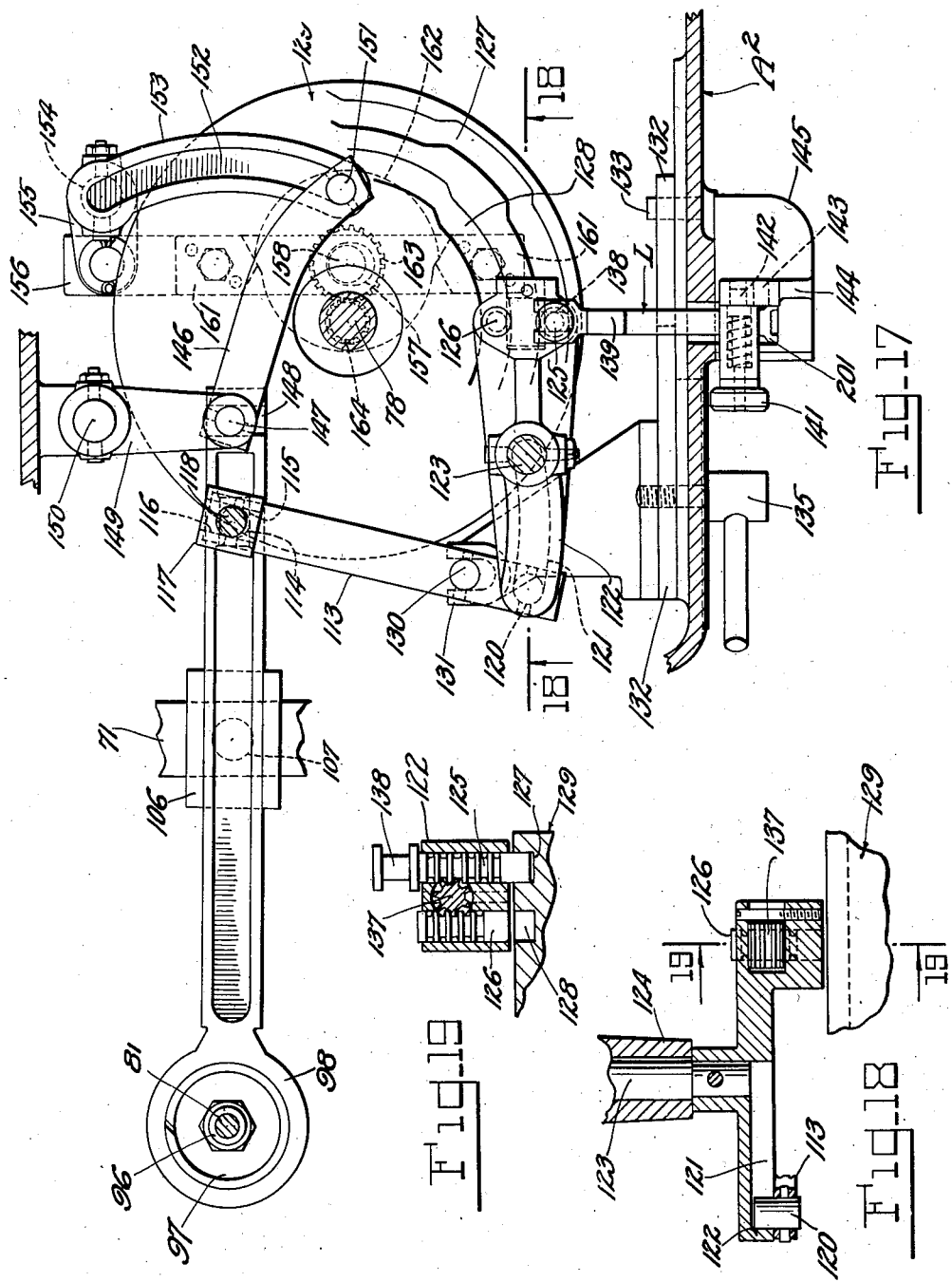

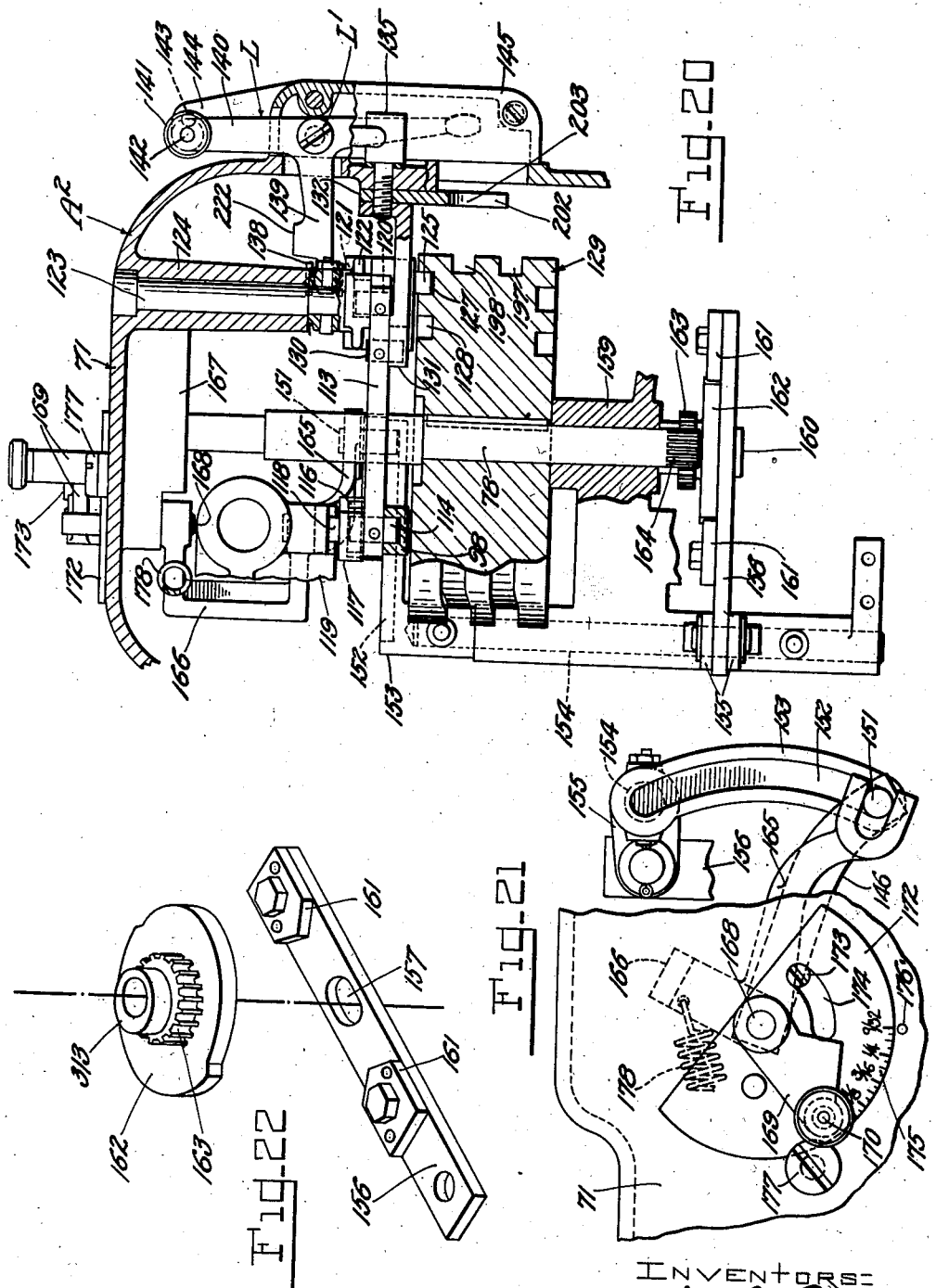

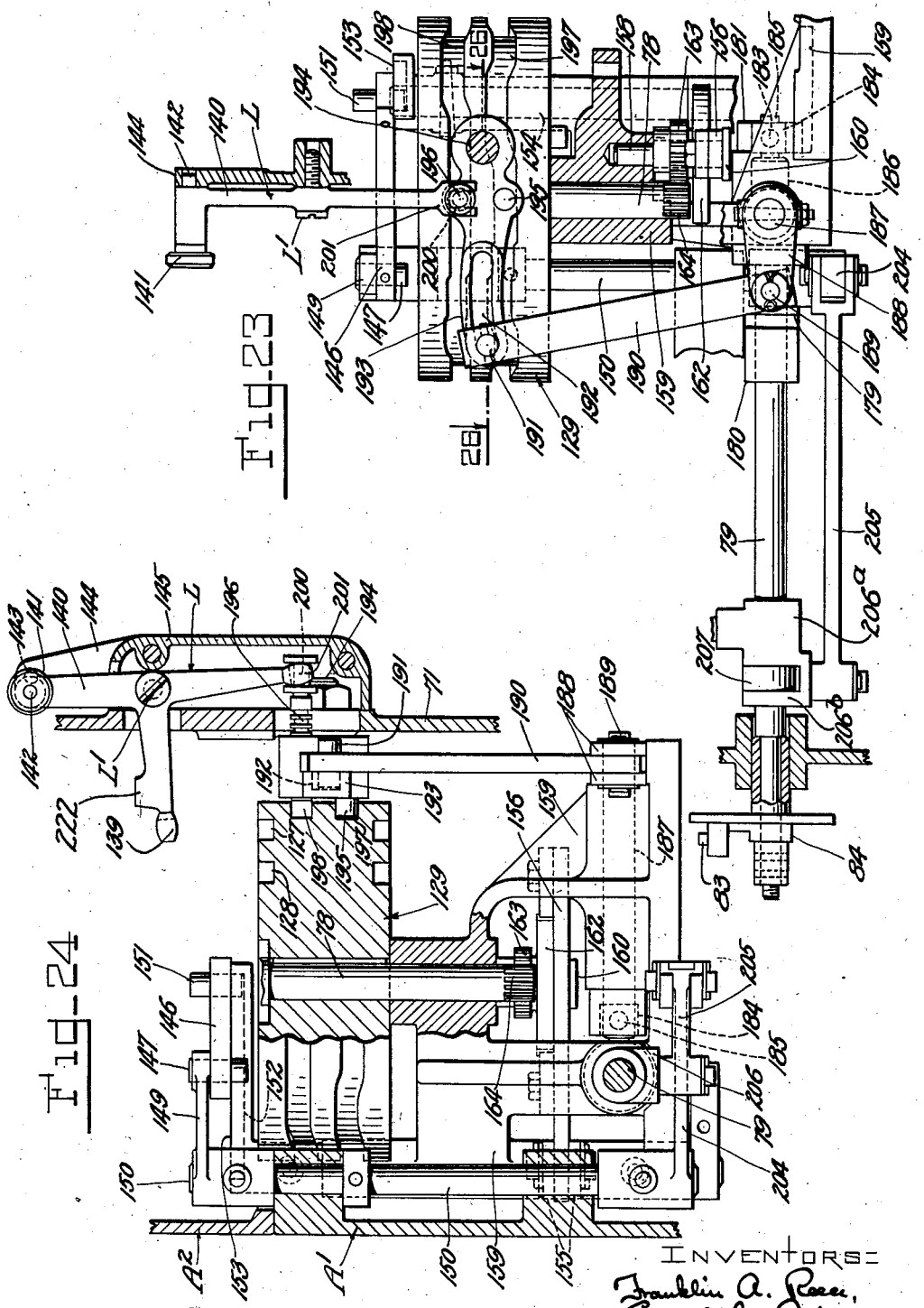

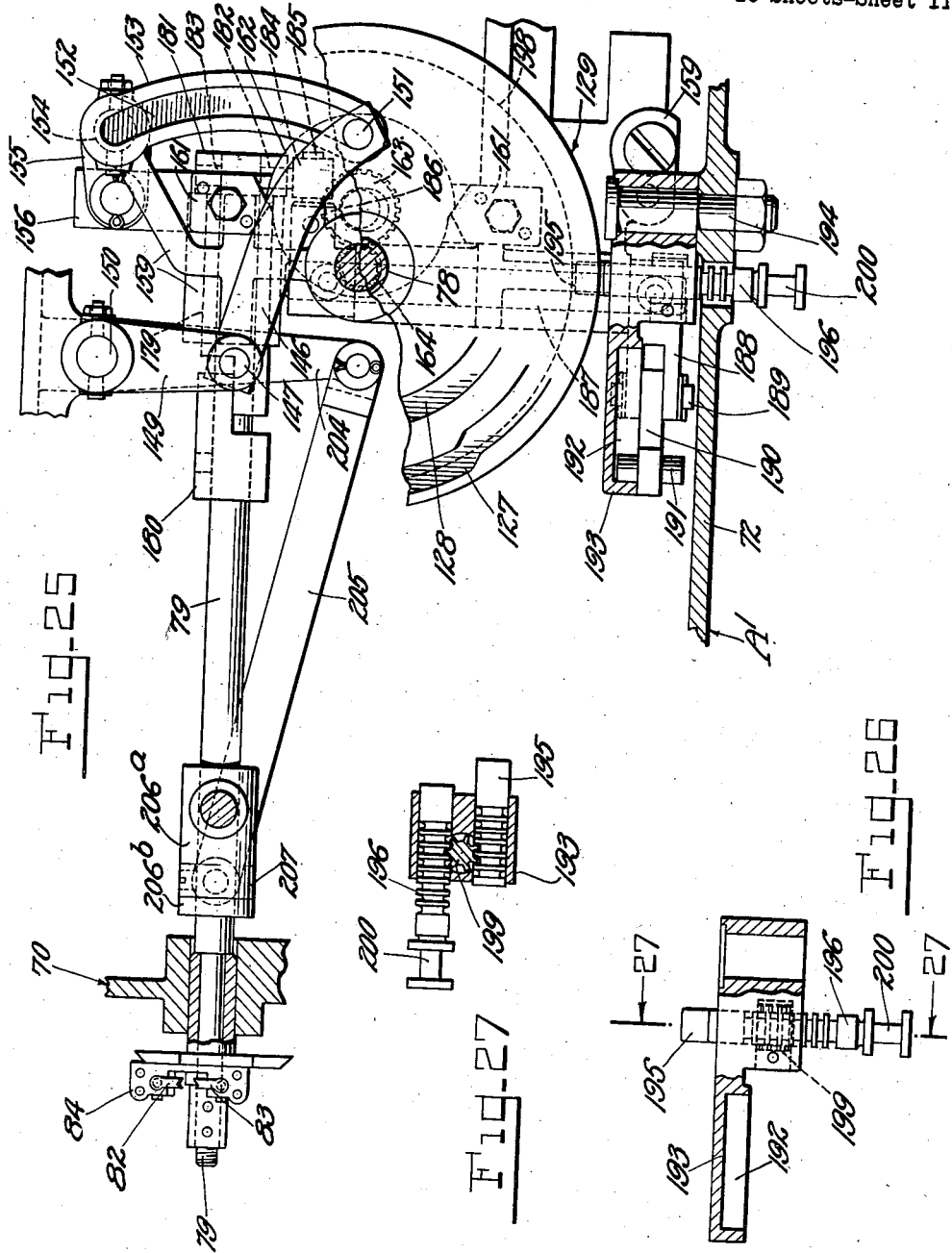

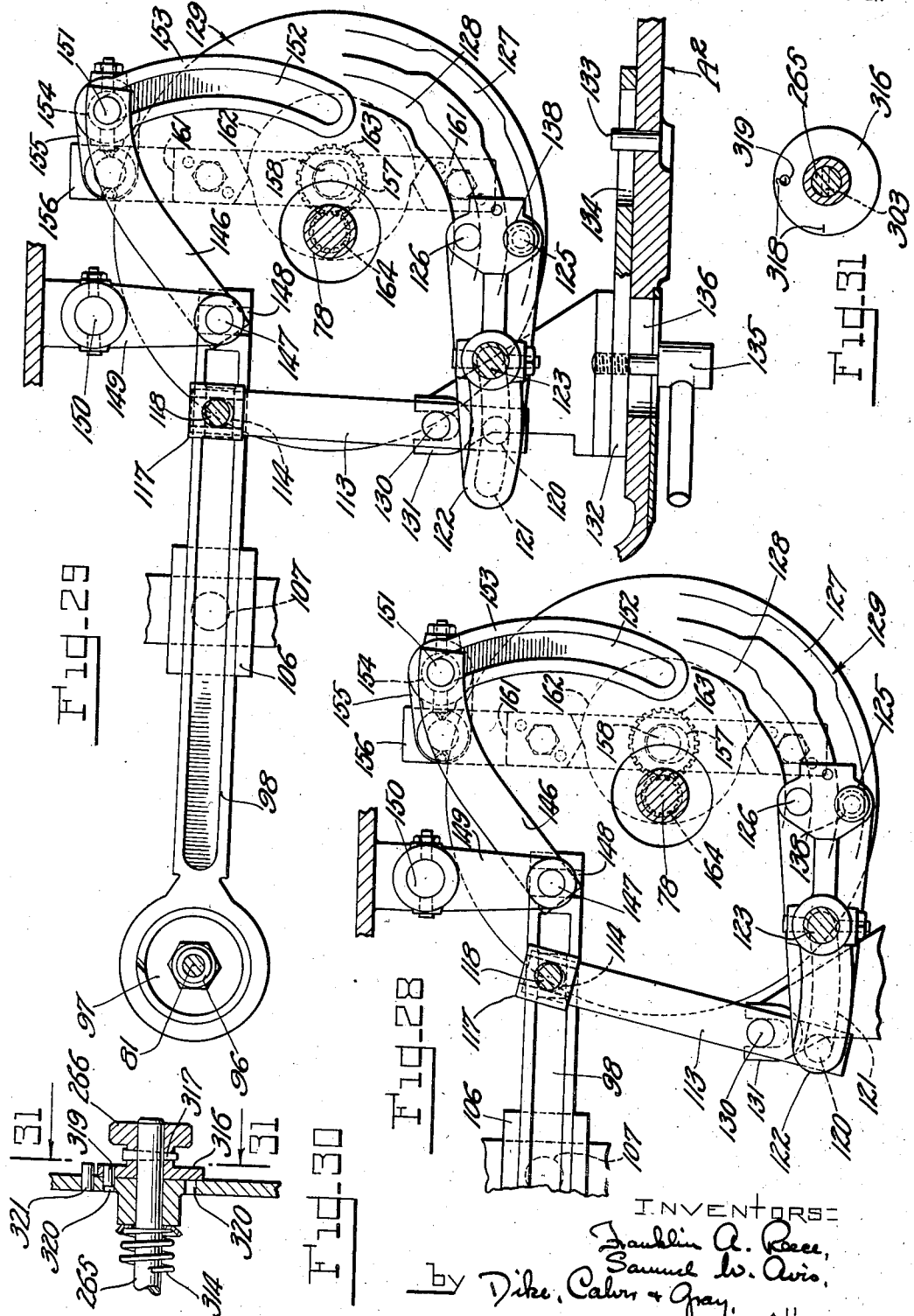

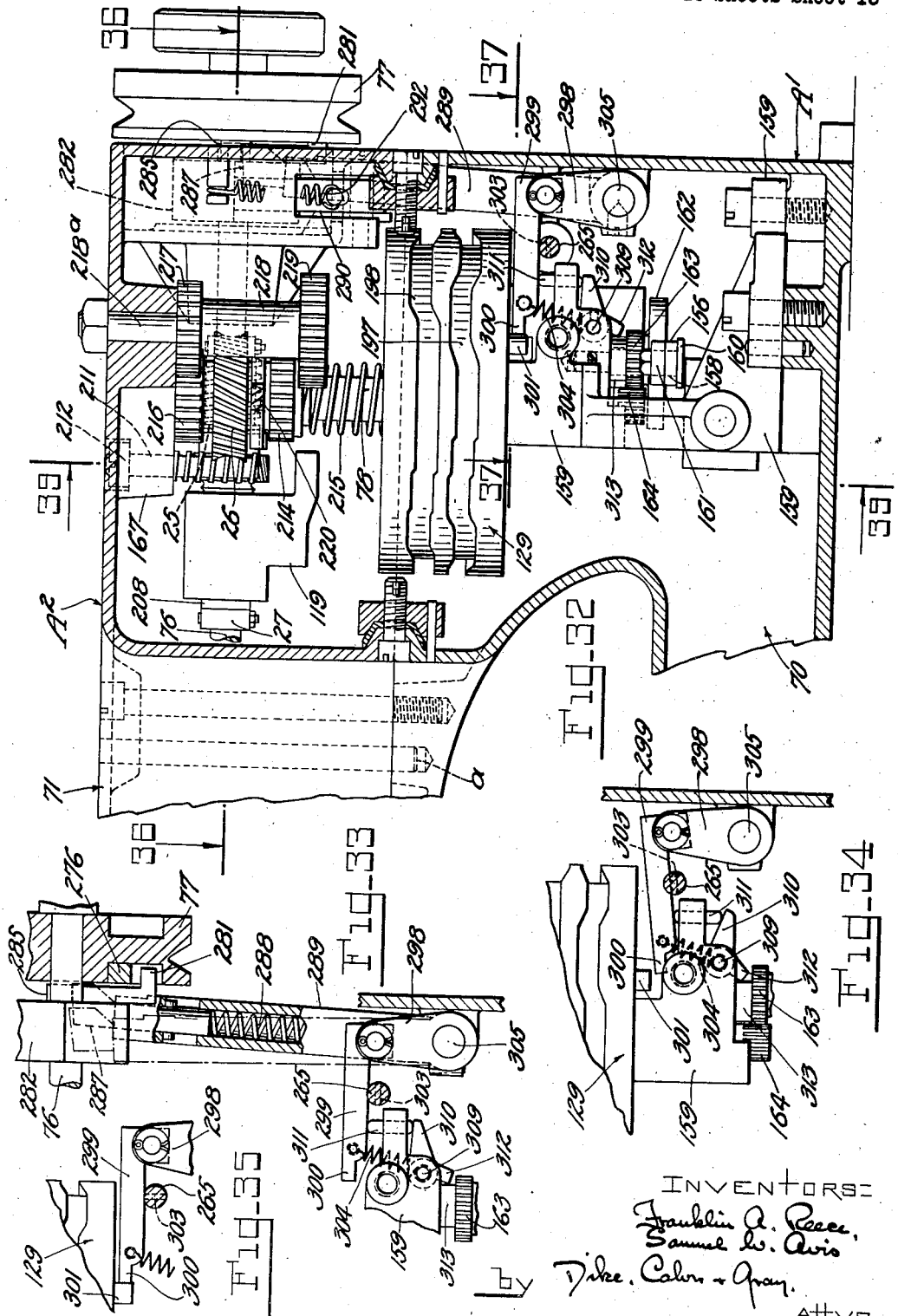

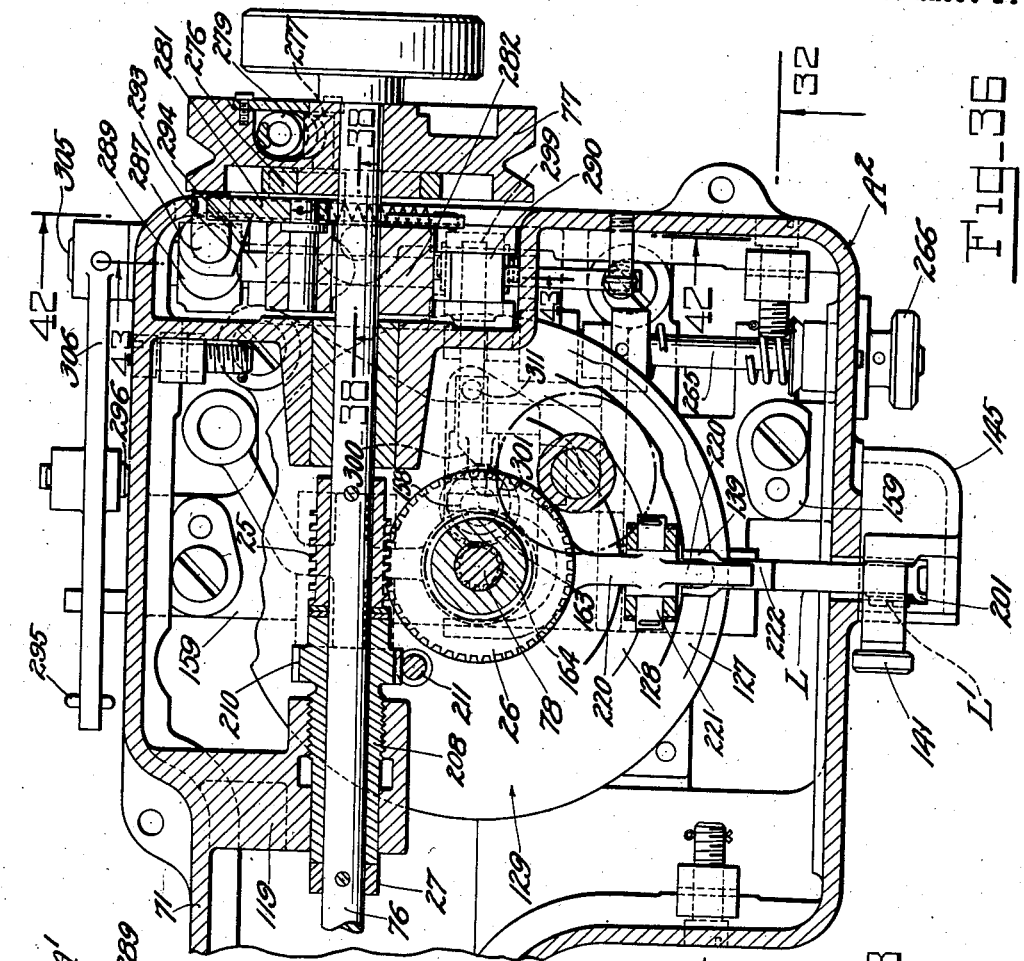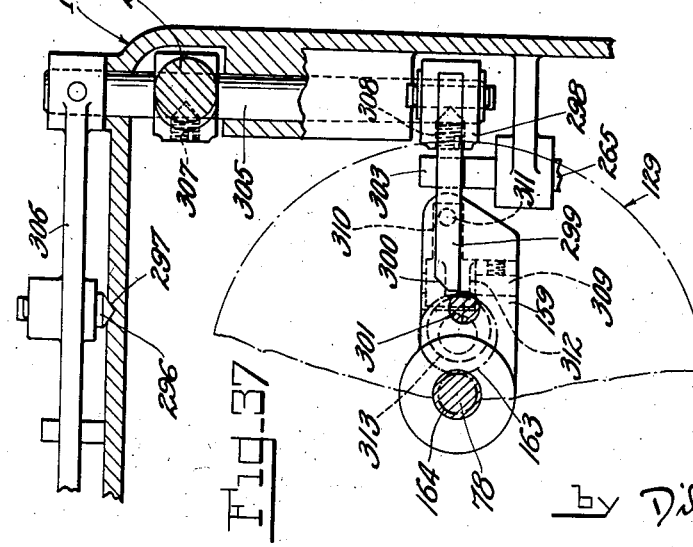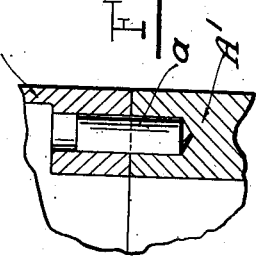

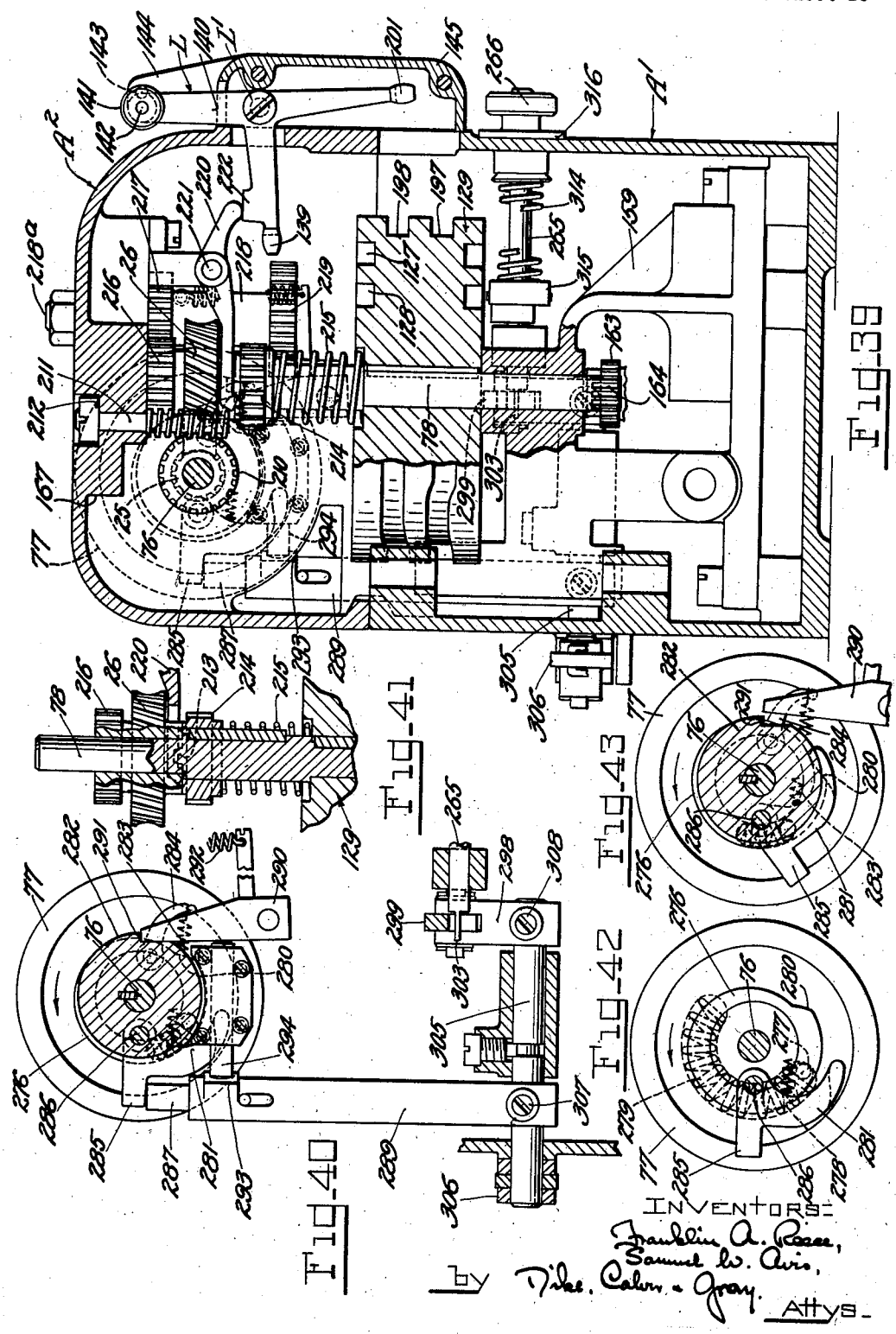

Oct. 25, 1938.  F. A. REECE ET AL  2,134,417
BUTTON SEWING MACHINE
Filed July 7, 1936  16 Sheets-Sheet 16
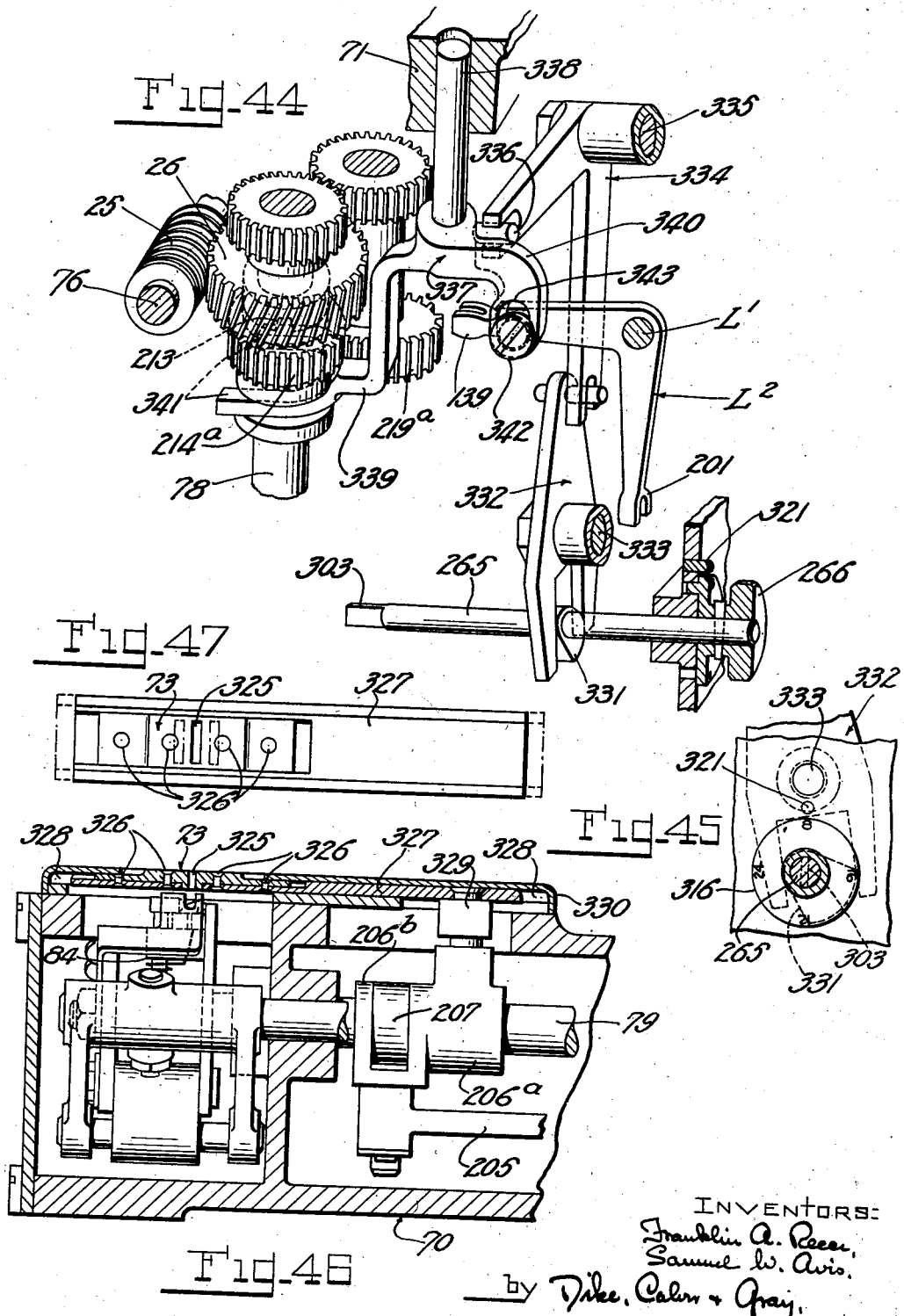
INVENTORS:
Franklin A. Reece,
Samuel W. Avis.
by Dike, Calver & Gray,
Attys.

Patented Oct. 25, 1938

2,134,417

UNITED STATES PATENT OFFICE 2,134,417

BUTTON SEWING MACHINE

Franklin A. Reece, Brookline, Mass., and Samuel W. Avis, Providence, R. I., assignors to The Reece Button Hole Machine Company, Boston, Mass., a corporation of Maine Application July 7, 1936, Serial No. 89,330

29 Claims. (Cl. 112—111)

This invention relates to machines for sewing on buttons, especially substantially flat buttons having perforations or holes through which the attaching thread is passed. Such buttons are of a wide variety of shapes and sizes, the number and spacing of the thread receiving holes differing in different buttons, and the number of stitches required for their satisfactory attachment varying with the number of holes, the size of the buttons, and the purpose and location of their attachment.

In another application, Serial No. 60,616, filed January 24, 1936, by Franklin A. Reece, one of the present applicants, is described an improved button sewing machine in which all of the movements necessary to attach either a two hole or a four hole button are imparted to the stitch forming instrumentalities, as distinguished from the work holding instrumentalities, and which can be set to attach either a two hole or a four hole button, having holes of any spacing within the range of the machine, by means of a variable number of groups of stitches, the thread being secured by a tying stitch at the completion of each group of attaching stitches. Said machine is entirely automatic and, having been set in operation with the work properly positioned therein, will perform and complete the sequence of operations for which it has previously been set or adjusted and thereafter come to rest.

The present invention relates to certain portions of the operating and controlling mechanism of automatic button sewing machines, and especially, although not exclusively, to machines of the type above referred to, and has for an important object to provide means whereby the number of stitches in each group, that is to say, the number of attaching stitches preceding each tying stitch, as well as the number of groups of stitches, can be varied in accordance with the requirements of the work.

Another object of the invention is to provide a simple and effective stop motion control which can be easily and conveniently set to determine the number of groups of stitches which are automatically formed.

A further object of the invention is to provide, in a button sewing machine in which the needle is moved laterally in a plurality of directions, means for adequately supporting the work while permitting all of said lateral needle movements.

Additional objects of the invention are to provide readily and conveniently operable adjusting and coordinating devices for the several controlling devices whereby the machine can readily be manually set for automatic operation in accordance with the requirements of a wide variety of work.

The foregoing and other objects of the invention, together with means whereby the latter may be carried into effect, will best be understood from the following description of an illustrative embodiment thereof shown in the accompanying drawings. The particular mechanism described and shown has, however, been chosen for purposes of exemplification merely, as it will be obvious to those skilled in the art that the invention, as defined by the claims hereunto appended, may be otherwise embodied without departure from the spirit and scope thereof.

In said drawings:

Fig. 1 is a side elevation, partly broken away, of the complete machine.

Figs. 2 and 3 are detail views illustrating the attachment of two different types of buttons.

Fig. 4 is a horizontal section taken substantially on the line 4—4, Fig. 1.

Fig. 5 is a detail section on the line 5—5, Fig. 1.

Fig. 6 is a horizontal section taken substantially on the line 6—6, Fig. 1.

Fig. 7 is a detail section taken substantially on the line 7—7, Fig. 1.

Fig. 8 is a front elevation, partly broken away, of the complete machine.

Fig. 9 is a vertical section taken substantially on the line 9—9, Fig. 1.

Fig 10 is a detail section taken substantially on the line 10—10, Fig. 1.

Fig. 11 is a plan view, and

Fig. 12 a side elevation of the main cam.

Fig. 13 is a fragmentary detail section on the line 13—13, Fig. 12.

Fig. 14 is a detail view of a portion of the adjusting mechanism for controlling the amplitude of the lateral movements of the stitch forming instrumentalities in accordance with the spacing of the holes in the button.

Fig. 15 is a fragmentary detail view of the mechanisms for producing the various movements of the needle.

Fig. 16 is a detail perspective view of the lower needle bar guide carrier through which the horizontal movements of the needle are effected and controlled.

Fig. 17 is a plan view, partly in section on the line 17—17, Fig. 15.

Fig. 18 is a detail section taken substantially on the line 18—18, Fig. 17.

Fig. 19 is a detail section taken substantially on the line 19—19, Fig. 18.

Fig. 20 is a detail section taken substantially on the line 20—20, Fig. 15.

Fig. 21 is a detail plan view, looking from the top of Fig. 15, of the devices for adjusting the mechanism to vary the amplitude of the fore and aft movements of the stitch forming devices.

Fig. 22 is a detail perspective view of certain of the elements of the mechanism shown in Figs. 15, 17 and 20.

Fig. 23 is a fragmentary detail view of the mechanism for effecting and controlling the movements of the looper carrier and loopers.

Fig. 24 is a similar view looking from the left in Fig. 23 with certain parts added.

Fig. 25 is a fragmentary plan view of the same mechanism.

Fig. 26 is a detail sectional view, taken substantially on the line 26—26, Fig. 23, of a part of the means for controlling the amplitude of oscillation of the looper carrier.

Fig. 27 is a detail section taken substantially on the line 27—27, Fig. 26.

Figs. 28 and 29 are views similar to Fig. 17, showing different adjustments of the parts to vary the needle movements in accordance with the work to be done.

Fig. 30 is a detail section taken substantially on the line 30—30, Fig. 6.

Fig. 31 is a detail section taken substantially on the line 31—31, Fig. 30.

Fig. 32 is a fragmentary longitudinal vertical section taken substantially on the line 32—32, Fig. 36, of the rear portion of the machine, showing certain of the driving connections.

Figs. 33, 34 and 35 are fragmentary detail views of certain of the parts in Fig. 32, showing them in different positions.

Fig. 36 is a horizontal section taken substantially on the line 36—36, Fig. 32.

Fig. 37 is a detail section taken substantially on the line 37—37, Fig. 32.

Fig. 38 is a detail section taken substantially on the line 38—38, Fig. 36.

Fig. 39 is a vertical section taken substantially on the line 39—39, Fig. 32.

Fig. 40 is a fragmentary detail view of certain of the parts in Fig. 39.

Fig. 41 is a detail sectional view of the drive shaft and associated parts shown in Fig. 39.

Figs. 42 and 43 are detail sections taken substantially on the lines 42—42 and 43—43, respectively, Fig. 36, showing the parts in different positions.

Fig. 44 is a fragmentary perspective view illustrating a modification of the setting devices.

Fig. 45 is a view, looking from the right in Fig. 44, of certain of the parts shown in the latter figure.

Fig. 46 is a longitudinal sectional view of the forward part of the base of the machine.

Fig. 47 is a detail plan view of the throat plate.

Referring to Figs. 1, 4, 6, 8 and 9, the frame or casing of the machine comprises a base or bed 70 and an overhanging head 71 supported therefrom by an upright housing portion 72 enclosing the principal parts of the operating and controlling devices. For convenience of assembly and repair, said frame or casing comprises two separable main sections $A^1$ and $A^2$ (Fig. 1) connected and relatively positioned by dowels $a$ (Figs. 4, 32 and 38) and several attached minor parts all of which collectively afford the necessary enclosures, supports, bearings, etc., for the various moving parts.

The bed 70 carries a work supporting throat plate 73 (hereinafter more fully described) upon which the fabric W to which the buttons are to be attached is supported and against which it is clamped by a presser foot 74 carrying a button clamp 75 for holding the individual buttons and positioning them for the operation of the sewing instrumentalities.

The main driving and controlling instrumentalities include a main power shaft 76 journalled in suitable bearings in the head 71 and to which power may be applied through a belt pulley 77 under the control of automatic stop mechanism hereinafter described; a vertical cam shaft 78 journalled in suitable bearings in the housing 72, driven through connections hereinafter described from the main shaft 76, and provided with suitable cams for controlling the movements of the several instrumentalities; and a horizontal looper shaft 79 journalled in suitable bearings in the base 70 and operated and controlled from the cam shaft 78.

The stitch-forming instrumentalities include an eye-pointed needle 80 carried by a needle bar 81 mounted for vertical or longitudinal reciprocation in the head 71 and a pair of loopers 82 and 83 on a looper carrier 84 secured to the looper shaft 79 adjacent its forward end. Except as hereinafter mentioned, these instrumentalities may be substantially as shown and described in the Dahl patent, No. 862,238, August 6, 1907, but, specifically, as shown herein are substantially as more fully shown and described in application Serial No. 64,693, filed February 19, 1936, by Joseph H. Pikul. The sewing thread $t$ is supplied to the needle 80 from a suitable source, not shown, through a tension device 85 and suitably arranged guides on the head and needle bar and shown, for example, at 86 and 87, under the control of the usual take-up 88 which, in this instance, is operated by a cam 89 upon the shaft 76.

The needle bar 81 is longitudinally reciprocated by a crank pin 90 carried by the cam 89 and connected by suitable linkage 91 with a collar 92 on said needle bar, and is guided adjacent its upper end in a bearing 93 which, as shown, is carried by a flexible metallic disk 94 suitably clamped in a recess 95 in the upper end of the head 71. This mounting of the needle bar guide 93 may be, and as shown is, substantially as more fully shown and described in the Reece Patent No. 1,993,350, March 5, 1935, and is such as to permit the needle bar a limited universal swinging movement about the point of intersection of its axis with the plane of the disk 94. Adjacent its lower end the needle bar is guided in a bearing 96 similarly mounted by means of a disk 97 in a carrier member 98 mounted, as hereinafter described, for movement in a horizontal plane both laterally and longitudinally of the machine frame.

In attaching a two-hole button B, as shown in Fig. 2, the carrier 98 is oscillated laterally between successive descents of the needle 80 to cause said needle to pass alternately through the holes $h$ and $h^x$ in the button, the looper carrier being at this time oscillated laterally by the shaft 79 to cause the loopers to cooperate with the needle in the formation of stitches $s$ passing through said holes and serving to attach the button to the fabric W. In attaching a four-hole button, such as shown at B' in Fig. 3, the same operations are performed to form a series of attaching stitches $s^1$ passing through the holes $h^1$ and $h^2$, after which the carrier 98 is shifted longitudinally, or in a direction fore and aft of the machine, to bring the needle into the plane of the holes $h^3$ and $h^4$ of the other pair, the looper shaft 79 with the looper carrier 84 and loopers 82 and 83 being similarly shifted to maintain the cooperative relationship of said loopers with the needle. Thereafter the sewing operations are repeated to form a second set of attaching stitches $s^2$ passing through the holes $h^3$ and $h^4$.

Specifically the presser foot 74 and button clamp 75 carried thereby form no portion of the present invention and may be of any construction and arrangement suitable to perform their intended functions and permit the operation of the stitch-forming instrumentalities as above described. As shown, the presser foot 74 is secured to a short upright rod 100, (see Figs. 1, 7 and 8) carried by an arm 101 projecting from a slide 102 guided for vertical movement in the head 71, the arrangement being substantially as more fully shown and described in application Serial No. 77,178, filed April 30, 1936, by the present applicants. The slide 102 is normally held downward to urge the presser foot against the work by a spring 103 but may be moved upwardly against the tension of said spring, to raise the presser foot, by a lever 104 connected by a chain 105 with a suitable treadle, not shown.

The carrier member 96 for the lower needle bar guide 96 is guided for longitudinal movement in a groove in the top of a head 106 (Figs. 1, 4, 15 and 17) having a shank or trunnion 107 received in a socket 108 in the bottom wall of the head 71 of the machine, whereby said head 106 is pivoted for oscillation about the axis of said shank. Said carrier is, therefore, free to move longitudinally in the head 106 or to oscillate laterally with said head about the pivotal axis of the latter. Said carrier is further held and guided for movement in a horizontal plane by channel members 109 (Figs. 1 and 10) each secured to bosses 110 on the bottom wall of the head 71 by bolts 111 (see also Fig. 4), said carrier being retained within the groove of said channel by a cover plate 112 secured in place by said bolts 111.

The carrier 98 is oscillated laterally about the axis of the pivot 107 to cause the needle to pass alternately through the holes $h$, $h^x$ (Fig. 2) $h^1$, $h^2$ (Fig. 3) or $h^3$, $h^4$, by mechanism most clearly shown in Fig. 17. Said mechanism comprises a link 113 having a pin or stud 114 (see also Figs. 9 and 20) a downwardly projecting portion of which is received in a longitudinally disposed way 115 (Fig. 16) in the upper face of the carrier 98, and an upwardly projecting portion of which is received in a way 116 (Fig. 20) in a head 117 having a shank 118 pivoted in a bracket 119 in the head 71. The way 116 permits lateral movement of the stud 114, and consequently lateral oscillation of the carrier, while holding said stud against longitudinal movement in the way 115; while the latter way permits longitudinal movement of the carrier 98 independently of said stud as hereinafter explained. The opposite end of the link 113 is provided with a stud 120 received in an arcuate groove 121 in one arm of a lever 122 (see also Figs. 9, 15 and 18) secured to an upright shaft 123 journalled in a bearing 124 depending from the top of the head 71. At its opposite end the lever 122 carries a pair of pins 125 and 126 (see also Fig. 19) adapted, respectively, for alternative engagement with cam grooves 127 and 128 in the upper face of a main cam 129 fast on the vertical cam shaft 78. In order to avoid confusion, the cam grooves 127 and 128 are only partially indicated in Figs. 4, 17, 25, 28, 29 and 36 but are clearly shown in full in Fig. 11. It will be seen that, when either of the pins 125 or 126 is engaged with its groove 127 or 128, rotation of the cam 129 will cause the lever 122 to swing about the axis of the shaft 123, and that this movement will be transmitted from said lever to the carrier 98 through the link 113.

The amplitude of the lateral vibration thus imparted to the carrier 98 will depend upon the point of engagement of the stud 120 with the groove 121, and in order to permit this to be readily adjusted in accordance with the lateral spacing of the holes in the button, the link 113 is provided with a third stud 130 engaged by a fork 131 (see also Figs. 4, 5, 9 and 14) carried by a slide 132 guided for horizontal movement on the side wall of the head 71 by a stud 133 projecting inwardly from said wall and engaging a slot 134 in the slide and a clamp screw 135 projecting through a slot 136 in the wall and in threaded engagement with said slide. By loosening the clamp screw the slide 132 may be moved longitudinally, and by tightening said clamp screw it may be secured in adjusted position.

As shown in Fig. 19, the pins 125 and 126 are formed with rack portions connected by a pinion 137, whereby when one of said pins is moved into operative position in engagement with its groove in the cam 129, the other of said pins will be lifted out of such position. Accordingly said pins may be rendered alternatively operative to place the lever 122 under the control of the cam groove 127 or 128, and thereby vary the number of stitches in each group $s$, $s^1$ or $s^2$ (Figs. 2 and 3), as hereinafter more fully explained. One of the pins, herein the pin 125, is formed with a grooved head 138 engaged by a fork 139 (see also Figs. 20 and 24) carried by one arm of a three-armed lever L pivoted at $L^1$ within a casing 145 secured to the exterior of the head 71. A second upstanding arm 140 of the lever L is provided with an operating handle 141 conveniently accessible from the exterior of the casing 145 and carrying a locking pin 142 engageable with apertures 143 in a lug 144 on the top of said casing, whereby said lever may be locked in either one of two positions to render either of the pins 125, 126 operative.

The mechanism for moving the carrier 98 longitudinally is likewise shown in Fig. 17 and comprises a link 146 having at its forward end a stud 147 received in a transverse groove or way 148 in the upper face of the carrier 98 adjacent its rear end. This construction permits the carrier to be swung laterally by the link 113, as above described, independently of the link 146 and stud 147. The stud 147 also pivotally connects the link 146 with an arm 149 (see also Fig. 24) on a vertical rock shaft 150 journalled in suitable bearings on the interior of the main casing, said connection serving to retain the stud 147 in the groove 148. At its rear end the link 146 carries a stud 151 which engages a groove 152 in an arm 153 secured to a second vertical rock shaft 154 (see Fig. 20). Adjacent its lower end the rock shaft 154 has secured thereto an arm 155 having a bifurcated end between the branches of which is pivoted the end of a link 156 having a slot 157 (Fig. 22) to receive a stud 158 (Fig. 15) depending from a bracket or interior frame member 159 within the main casing and the form of which is most clearly shown in Fig. 9. The link 156 is, therefore, guided on the stud 158 by engagement of the latter with the slot 157 and is supported by a flange or head 160 on the lower end of the stud. The link 156 has secured thereto a pair of contact or cam-follower blocks 161 embracing between them and cooperating with an edge cam 162 rotatably mounted on the stud 158 and the hub of which is provided with a spur gear 163 meshing with a pinion 164 on the lower end of the main cam shaft 78. The gear 163 and pinion 164 are of such sizes as to constitute two to one gearing between the cam 162 and the cam shaft 78, so that the cam 162 is rotated at one half the speed of the main cam 129. Accordingly, after one complete rotation of the cam 129 to cause the cam groove 127 or 128 thereof to produce a predetermined number of lateral reciprocations of the needle bar to form, for example, the group of stitches $s^1$ (Fig. 3), the cam 162 will cause the carrier 98 and needle bar to be shifted longitudinally of the machine in one direction, after which a second rotation of the cam 129 will cause the necessary number of lateral reciprocations to form the group of stitches $s^2$, whereupon the cam 162 will return the carrier and needle bar to their original longitudinal positions.

The amplitude of the longitudinal or fore and aft movement of the carrier 98 and needle bar 81 is determined by the position of the stud 151 in the groove 152 of the arm 153, and, in order that this may be conveniently adjusted in accordance with the fore and aft spacing of the holes $h^1$, $h^2$, and $h^3$, $h^4$, there is provided a fork 165 (Figs. 15, 20 and 21) carried by a yoke 166 the arms of which are co-axially pivoted in the bracket 119 and in a boss 167 in the top of the head 71 respectively. The pin 168 which constitutes the upper pivot of the yoke 166 extends through the top wall of the head 71 to the exterior of the latter and has secured thereto a hand lever 169. The hand lever 169 carries a manually releasable, spring pressed locking pin 170 which normally engages an opening 171 (Fig. 15) in a segmental index plate 172 mounted to turn about the pivot pin 168 to an extent limited by the engagement of a pin 173 on the top of the head with an arcuate slot 174 in said plate. The plate 172 has on its edge a graduated scale 175 cooperating, as the plate is turned, with an index mark 176 on the top of the head, said plate being secured in adjusted position by a clamp screw 177. The handle 169 being normally locked to the plate 172 by the plunger 170, when said plate is turned into a predetermined position, as indicated by registration of the proper point on the scale 175 with the index mark 176, the stud 151 will be moved in the slot 152 to vary the amplitude of the fore and aft movement of the carrier 98, it being understood that the graduations on the scale 175 are suitable to indicate fore and aft spacing of pairs of holes in a four-hole button. A spring 178 is suitably connected with the yoke 166 to tend to turn the latter in a counter-clockwise direction as shown in Fig. 21, so that by releasing the locking pin 170, said spring will turn the yoke to cause the fork 165 to move the pin 151 into a position co-axial with the shaft 154, whereupon there will be no longitudinal movement of the carrier 98, thereby adjusting the machine for operation upon a two-hole button.

Figs. 4 and 17 show the adjustment of the parts for a four hole button having the maximum hole spacing for which the machine is adapted. Fig. 28 shows the adjustment for a two hole button of maximum hole spacing. Fig. 29 shows the adjustment for a two hole button having holes more closely spaced. It will be obvious that for a four hole button of closer spacing the adjustment would be similar to that shown in Fig. 29 but with the stud 151 in a position intermediate the positions shown in Figs. 17 and 28.

The looper shaft 79 is slidably mounted at its rear end in a sleeve 179 (see Fig. 25) rotatably mounted in a suitable bearing in the frame member 159. Adjacent the forward end of the sleeve 179 the shaft 79 has secured thereto a collar 180, and the contiguous ends of said sleeve and collar are suitably formed to constitute the complementary elements of a slip coupling or clutch connecting the sleeve and shaft for oscillation in unison while permitting longitudinal movement of the shaft relative to the sleeve. At its rear end the sleeve 179 is formed with a head 181 having a transverse bore 182 in which a stud 183 is rotatably and slidably mounted. The stud 183 is provided with a head 184 (see also Figs. 23 and 24) having a transverse bore in which is slidably and rotatably received a stud 185 secured within and projecting longitudinally from the end of an arm 186 secured to one end of a transverse rock shaft 187 (see also Fig. 1) journalled in a suitable bearing in the frame member 159. By this construction the shaft 187 and sleeve 179, although disposed perpendicular to one another, are connected for oscillation in unison. At its opposite end the rock shaft 187 has secured thereto a bifurcated arm 188 between the bifurcations of which is pivoted at 189 the lower end of a link 190. The upper end of the link 190 is provided with a transverse stud 191 the inwardly projecting end of which is received in an arcuate groove 192 in one end of a lever 193 fulcrumed at its opposite end on a stud 194 projecting inwardly from the side wall of the housing 72. Intermediate its ends the lever 193 carries a pair of pins 195 and 196 adapted respectively for alternative engagement with cam grooves 197 and 198 formed in the side or periphery of the main cam 129. The pins 195 and 196 like the pins 125 and 126, are formed with rack portions connected by a pinion 199 (Fig. 27) whereby when one is projected into its cam groove, the other will be withdrawn, and vice versa. One of said pins, herein the pin 196, is formed with a grooved head 200 engaged by a fork 201 carried by the third arm of the three-armed lever L. The arangement is such that when the pin 126 is engaged with the groove 128, the pin 196 is engaged with the groove 198; and when the pin 125 is engaged with the groove 127, the pin 195 is engaged with the groove 197. The groove 197 corresponds to the groove 127, that is to say, the number and timing of the oscillations of the looper shaft 79 produced by the former correspond to the number and timing of the lateral oscillations of the needle produced by the latter. Similarly the groove 198 corresponds to the groove 128. Accordingly the oscillations of the loopers are synchronized with the lateral oscillations of the needle, and it is obvious that the amplitude of the former must vary with the amplitude of the latter. The amplitude of oscillation of the looper shaft 79 depends upon the position of the stud 191 in the groove 192 of the lever 193, and in order that this position may be suitably adjusted concurrently with the adjustment of the position of the stud 120 in the groove 121 of the lever 122, the slide 132 (Fig. 14) by which the latter stud is adjusted is provided with a depending flange 202 having a slot 203 to receive the outwardly projecting end of the pin 191 (see also Fig. 1). Consequently, when the slide 132 is adjusted in accordance with the lateral spacing of the holes in the button, the studs 120 and 191 will be simultaneously adjusted to control both the lateral throw of the needle and the amplitude of vibration of the loopers, thereby maintaining the proper relation between the movements of said parts.

When the needle bar carrier 98 is shifted longitudinally, or in a direction fore and aft of the machine, in sewing a four-hole button, in order to transfer the operation of the needle from the plane of one pair of holes, for example, the holes $h^1$, $h^2$, to the plane of another pair, for example, the holes $h^3$, $h^4$, the looper shaft 79 must be likewise shifted longitudinally to maintain the proper cooperative relationship of the loopers to the needle, and to this end, in the construction shown, the following means are provided, reference being had to Figs. 1, 6, 9, 23, 24 and 25. The vertical rock shaft 150, whose arm 149 is connected with the link 146 by the pin 147, has secured to its lower end a second arm 204 connected by a link 205 with a sleeve 206ª on the looper shaft 79 and having a portion 206ᵇ recessed to receive and embrace a collar 207 secured to said looper shaft, whereby, when the carrier 98 is shifted longitudinally by the lever 153 acting through the link 146, the shaft 79 will be correspondingly shifted longitudinally. As above stated, the main cam 129 makes one complete rotation for each group of stitches $s$, $s^1$ or $s^2$, and the number of stitches of each group depends upon the shape of the cam grooves 127, 197 and 128, 198. Referring to Fig. 11, the cam groove 128 is formed with three radially offset portions, adapted to produce three complete lateral reciprocations of the needle, in synchronism with the vertical reciprocations thereof, and with a concentric portion 231 during which the needle is caused to make two descents through the same hole in the button in order to form a knot or tying stitch. The groove 198 is correspondingly formed to produce the requisite oscillatory movements of the loopers 82 and 83 to cause them to cooperate alternately, with the needle in the formation of the attaching stitches and includes a portion 273 so shaped as to cause one of said loopers to cooperate twice in succession with said needle when the latter descends twice through the same hole in the formation of the tying stitch. Consequently, when the pin 126 is engaged with the groove 128 and the pin 196 with the groove 198, each group of stitches will comprise six attaching stitches and a tying stitch, the whole group requiring eight vertical reciprocations of the needle. Similarly the groove 127 is formed with five radially offset portions, the groove 197 being correspondingly formed, so that when the pins 125 and 195 are engaged with the grooves 127 and 197, each complete rotation of the cam will result in the formation of ten attaching stitches and a tying stitch during twelve vertical reciprocations of the needle.

Since the cam 129 makes one complete rotation for a variable number of vertical reciprocations of the needle bar, that is to say, eight reciprocations when the cam grooves 128 and 198 are operative, and twelve reciprocations when the grooves 127 and 197 are operative, it is necessary to provide variable speed driving connections between the main shaft 76 and the cam shaft 78 to vary the relative speed of said shafts, so that the number of vertical reciprocations of the needle will be in proper relation to the number of lateral reciprocations thereof during the rotation of the cam 129. To this end, in the construction shown, the following mechanism is provided, reference being had particularly to Figs. 9, 32, 36, 39 and 41.

The main shaft 76 has pinned thereto a worm 25 which meshes with a worm gear 26 loose on the cam shaft 78 but adapted to be clutched thereto as hereinafter described. Interposed between the worm 25 and a collar 27 on the shaft 76 is a bushing 208 in threaded engagement with an opening in the bracket 119 which projects inwardly from one of the side walls of the head 71. The bushing 208 is formed with a worm gear 210 which meshes with a worm on a spindle 211 journalled in the top of the head and extending to the exterior thereof where it is provided with a head 212 by which it may be turned. By this means the shaft 76 and worm 25 may be adjusted longitudinally to a slight extent to correct any errors in the angular positioning of the cam shaft with reference to the main shaft which might interfere with the proper synchronizing of the vertical and horizontal movements of the needle.

The hub of the worm gear 26 is suitably formed to constitute one element of a jaw clutch 213 (see particularly Fig. 41), the complementary element of which is formed on a spur gear 214 splined on the cam shaft 78 and normally urged in the direction to engage said clutch elements by a spring 215 interposed between said gear and the top of the cam 129. When said clutch elements are engaged, the worm gear 26 is clutched to the shaft 78 so that the drive to the shaft 78 from the shaft 76 is direct through said worm gear and the worm 25 and is in the ratio of one to twelve. In order to drive the cam shaft 78 at a greater speed relative to that of the main shaft 76, the worm gear 26 has secured thereto or formed integrally therewith a spur gear 216 which meshes with a spur gear 217 on a sleeve 218 (Figs. 32 and 39) rotatably mounted on a stud shaft 218ª depending from the top of the head 71. At its opposite end the sleeve 218 is provided with a second spur gear 219 with which the gear 214 is meshed when moved downwardly against the tension of the spring 215 to unclutch the worm gear 26 from the shaft 78. The cam shaft 78 is then driven from the main shaft 76 through the worm 25, worm gear 26, gears 216 and 217, sleeve 218, and gears 219 and 214, the several gears being suitably proportioned to cause the cam shaft 78 to be driven from the main shaft 76 at a speed ratio of one to eight. The gear 214 may be moved downwardly against the tension of the spring 215, to unclutch the worm gear 26 and mesh said gear 214 with the gear 219, by a lever 220 (Fig. 39) pivoted at 221 to a hanger depending from the top of the head, one end of said lever being bifurcated and engaging the top of the gear 214, and its other end being engaged by a projection 222 on the arm of the three-armed lever L which carries the fork 139. When, therefore, said lever is in the position shown in Figs. 24 and 39 to render the grooves 127 and 197 operative through the pins 125 and 195, the worm gear 26 is clutched to the cam shaft 78 for the direct drive, but when said lever L is moved into the position to render the grooves 128 and 198 operative through the pins 126 and 196, the drive from the worm gear 26 to cam shaft 78 is through the gears 216, 217, 219 and 214.

The throat plate 73 (Figs. 1, 8 and 46) upon which the work W is supported is provided with an opening 325 through which the needle passes, and in order to permit the lateral movements of the needle in passing from one hole to the other of the same pair, as well as the fore and aft movements of said needle in passing from one pair of holes to another, without making the opening 325 so large as to impair the work supporting function of the throat plate 73, means are provided for moving said throat plate horizontally in accordance with at least one of said movements of the needle. As shown, said opening is in the form of a transverse slot (Fig. 47) of a length corresponding to the maximum lateral movement of the needle and of a width just sufficient to permit the needle to pass, and the throat plate is secured, as by rivets 326 (Fig. 46), to a slide 327 guided for longitudinal movement in a way 328 formed in the top of the base 70, said slide being connected by a stud 329 to the sleeve 206ª. Consequently, when the looper shaft 79 is moved longitudinally to cause the loopers to follow the fore and aft movement of the needle, the throat plate, with its slot 325, will be correspondingly shifted. The slide 327, way 328, and reduced end portions of the throat plate 73 are preferably enclosed by a removable cover plate 330 suitably secured to the top of the base 70.

The belt pulley 77 (Fig. 1) is loose on the shaft 76 and is adapted to be clutched thereto by a combined clutch and stop mechanism which as herein shown is similar to those shown and described in the patents to Mello, No. 1,227,643, May 29, 1917, and Reece, No. 1,730,014, October 1, 1929. Referring to Figs. 33, 36, 40, 42 and 43 said mechanism includes a ring 276 carried by the pulley 77 and having a pin 277 which projects through a slot 278 in said pulley and is engaged by a spring 279 located in a recess in said pulley, whereby said ring is permitted a limited yielding angular movement with respect to the pulley, in order to cushion the shock of starting. The ring 276 has a shoulder 280 adapted to be engaged by a clutch dog 281 pivoted at 286 to a hub 282 keyed to the shaft 76 and normally urged into engagement with said shoulder by a spring 283 connecting said dog with an arm 284 fixed to said hub. The dog 281 is formed with a stop arm 285 adapted, when the connected parts are rotated in the direction of the arrows on Figs. 40, 42 and 43 to engage a head 287 yieldingly mounted by means of a spring 288 in the end of a stop arm 289 when the latter is in the position shown in full lines in Fig. 33, thereby disengaging the dog 281 from the shoulder 280 as shown in Fig. 40 and stopping the rotation of the shaft 76, the shock of stopping being cushioned by the spring 288. Recoil of the shaft under the influence of the spring 288 is prevented by a pawl 290 normally urged into a position to be engaged by a shoulder 291 on the hub 282 by means of a spring 292. The stop arm 289 is formed with a cam surface 293 which cooperates with a plunger 294 slidably mounted in the frame and engaging the pawl 290. The arrangement of the parts is such that, when the stop arm 289 is in the position shown in dot-and-dash lines in Fig. 33, the head 287 is out of the path of movement of the arm 285 of the dog 281, permitting the latter under the influence of the spring 283, to engage the shoulder 280, as shown in Fig. 43, thereby connecting the pulley 77 and hub 282 for rotation in unison in the direction of the arrows. The cam surface 293 at the same time acts through the plunger 264 to hold the pawl 270 in the inoperative position shown in Fig. 43. When the stop arm 289 is in the position shown in full lines in Fig. 33, the head 287 will be engaged by the stop arm 285 to disconnect the parts and stop the machine, as above described. The cam surface 293 at this time permits the plunger 294 to be forced back by the spring 292, thereby permitting said spring to move the pawl 290 into operative position for engagement by the shoulder 291, as shown in Fig. 40.

The stop arm 289 is secured, as by a set screw 307 (Figs. 37 and 40), to a rock shaft 305 journalled in the frame and having secured thereto at the exterior of the casing an arm 306 (Figs. 1, 36 and 37) connected by a chain 295 (Fig. 1) with a suitable treadle (not shown), said arm being preferably provided with a spring pressed positioning plunger 296 adapted to engage either one of the two recesses or depressions 297 (Figs. 1 and 37) in the outer wall of the casing, thereby releasably retaining the stop arm 289 in either of the two positions shown in Fig. 33. To start the machine, the treadle is depressed, thereby rocking the shaft 305 in the direction to move the stop arm 289 into the position shown in dot-and-dash lines in Fig. 33. The machine having been started will continue to operate until automatically stopped. For this purpose the following mechanism is provided:

Secured, as by a set screw 308 (Fig. 40), to the inner end of the rock shaft 305 is an arm 298 having a bifurcated end between the bifurcations of which is pivoted a bunter 299 having a bevelled free end 300 adapted, when said bunter is in the elevated position shown in Figs. 33 and 35, to be engaged by a stud 301 (see also Figs. 11 to 13), projecting from the under side of the main cam 129 when the latter reaches an angular position corresponding to the completion of the tying stitch. Such engagement of the end 300 of the bunter 299 by the stud 301 causes said bunter to be forced toward the right in Fig. 33, thereby rocking the shaft 305 in a clockwise direction and moving the stop arm 289 into the position shown in full lines in Fig. 33 to disengage the clutch and stop the machine. The stud 301 is preferably notched, as shown at 302 in Figs. 6 and 13, so that the slight overthrow of the parts incidental to stopping the machine will bring said notch opposite the end of the bunter 299 in order to permit the machine to be again started by operation of the treadle.

A shaft 265 (Figs. 9, 30 and 31) is journalled in the frame and is provided outside the casing with an operating handle 266 whereby it may be conveniently turned. Said shaft is formed with a flattened end portion 303 (Figs. 33, 34, 35 and 40) adapted, when said shaft is turned into the position shown in Fig. 35 to hold the bunter 299 in its operative position in the path of movement of the stud 301 to stop the machine after one complete rotation of the cam 129 and the consequent completion of one group of attaching and tying stitches, as in sewing a two-hole button B, Fig. 2. When turned into the position shown in Figs. 34, 37 and 40, however, the flattened portion 303 permits the bunter 299 to be drawn by a spring 304 into the inoperative position shown in Fig. 34 out of the path of movement of the stud 301, thereby permitting the continued operation of the machine after one complete rotation of the cam 129, as in sewing two groups of stitches attaching a four-hole button B (Fig. 3), until raised into its operative position by the following mechanism:

Pivoted as at 309 (Figs. 32, 33 and 34), to the frame member 159 (Figs. 20 and 32) is a bell crank lever having one arm 310 in engagement with a vertically sliding plunger 311 guided in said frame member and adapted, when raised, to lift the bunter 299 from the inoperative position shown in Fig. 34 into the operative position shown in Fig. 33. The other arm 312 of said bell crank lever engages a cam or eccentric 313 formed on the hub of the gear 163 and cam 162 (see also Fig. 22). As above explained, the cam and gear assembly 162, 163, 313 makes one complete rotation to two complete rotations of the cam shaft 78 and main cam 129, and the eccentric 313 is so arranged that at the completion of one rotation of the cam 129 the bell crank 310, 312 and plunger 311 will be in the positions shown in Fig. 34, but at the completion of a second rotation of the cam 129 said parts will be in the position shown in Fig. 33, thereby lifting the bunter 299 into operative position and causing the stopping of the machine upon the completion of said second rotation.

It will thus be seen that with the shaft 265 in the position shown in Fig. 35 the machine will be stopped after the completion of one group of attaching and tying stitches of a predetermined number depending upon whether the pins 125 and 195 or the pins 126 and 196 are engaged with their respective cam grooves. When, however, the shaft 265 is in the position shown in Figs. 33 and 34, the machine will be stopped after the completion of two groups of attaching and tying stitches each of a number similarly determined. By a suitable angular setting of the shaft 265 by means of the handle 266, and of the lever L, Fig. 20, by means of the handle 141, the machine can be set to complete automatically either one group of stitches resulting from either eight or twelve vertical reciprocations of the needle, or two groups of stitches of the same alternative character, the two groups resulting from either sixteen or twenty-four such reciprocations. The shaft 265 is mounted for a limited longitudinal movement in opposition to a spring 314 (Figs. 9, 30 and 39) interposed between the casing wall and a collar 315 on said shaft, said spring normally holding the shaft in the longitudinal position shown. Secured to the shaft 265 immediately adjacent the outer face of the casing wall is a disk 316 (Figs. 30 and 31), said disk being preferably formed integral with the handle 266 and the whole unit being secured to the shaft by a key 317. The disk 316 is provided about its periphery with a series of index characters 318 and also carries a stud 319 adapted to engage any one of a circular series of apertures 320 in the casing wall, whereby the angular position of the shaft may be fixed with any of the index characters 318 opposite a fixed index or reference pin 321. As shown, the index characters 318 comprise the numerals "1" and "2" disposed at 90° to one another. The arrangement is such that when the numeral "1" is opposite the index pin 321, the shaft 265 is in the position shown in Fig. 35 so as to stop the machine after one rotation of the cam 129 and consequently upon the completion of one group of attaching and tying stitches and when the numeral "2" is opposite the index pin, the shaft 265 is in the position shown in Figs. 33 and 34, so that the machine is not stopped until after two rotations of the cam 129 and the completion of two groups of stitches. By drawing the shaft 265 outwardly a limited distance against the tension of the spring 314, the locking pin 319 may be disengaged from the aperture 320 with which it is engaged, the shaft turned to bring the desired index numeral 318 opposite the reference pin 321, and the shaft released to permit the spring 314 to re-engage the pin 319 with another aperture 320, thereby locking the shaft in readjusted position.

In order to set the machine to sew a two-hole button B (Fig. 2), the following adjustments are made. The locking pin 170 (Figs. 15 and 21) is disengaged from the opening 171 in the index plate 172, permitting the spring 178 to turn the yoke 166 and carry the pin 151 into a position coaxial with the shaft 154, as shown in Figs. 28 and 29. The slide 132 (Figs. 5, 9 and 14) is adjusted, in accordance with the lateral spacing of the holes $h$, $h^x$ (Fig. 2), to position the studs 120 (Figs. 17, 28 and 29) and 191 (Fig. 23) at the proper points in the slots in their respective lever arms 122 and 193 to give the required amplitude of lateral vibration to the needle and loopers. The lever L (Figs. 9, 17, 20 and 24) is set to engage the pins 125 (Fig. 19) and 195 (Figs. 24 and 27) with their respective cam grooves 127 and 197, or the pins 126 and 196 with their respective cam grooves 128 and 198, according to whether a "twelve stitch" group or an "eight stitch" group is desired. The shaft 265 (Figs. 9, 30 and 31) is angularly set to stop the machine upon the completion of one group of stitches, that is to say, the index numeral "1" is set opposite the reference pin 321. The starting treadle (not shown) is then depressed and acts through the chain 295 (Fig. 1) and arm 306 to rock the shaft 305 (Fig. 33) in a counter-clockwise direction, thereby disengaging the head 287 of the stop arm 289 from the arm 285 (Figs. 40, 42 and 43) of the clutch dog 281 and starting the machine. During the operation of the machine the rock shaft 305 is retained in the position into which it has been moved by the starting treadle by engagement of the plunger 296 (Fig. 37) with the appropriate recess 297. The machine thereupon operates to cause the needle to descend alternately through the holes $h$ and $h^x$ and the looper mechanism to cooperate therewith to form a group of attaching stitches, and thereafter to cause said needle to descend twice through the same hole to form a tying stitch. Upon the completion of the stitch group for which the machine has been set, the stud 301 (Figs. 35 and 37) engages the end of the bunter 299, forcing the same toward the right and thereby rocking the shaft 305 in a clockwise direction and moving the stop arm 289 into the position shown in full lines in Fig. 33. The arm 285 of the clutch dog 281 thereupon engages the head 287, disengaging the clutch and positively stopping the shaft 76, the impact being cushioned by the spring 288. Movement of the stop arm 289 into stopping position causes the cam surface 293 (Fig. 36) on the stop arm 289 to release the plunger 294 (Figs. 36 and 40), so that the spring 292 moves the pawl 290 into position to be engaged by the shoulder 291 to check the recoil of the spring 288, as shown in Fig. 40.

In order to set the machine to sew a four-hole button B' (Fig. 3), the locking pin 170 (Figs. 15 and 21) is engaged with the opening 171 in the index plate 172, and the connected index plate and hand lever 169 turned until the proper graduation (in accordance with the fore and aft spacing of the pairs of holes $h^1$, $h^2$, and $h^3$, $h^4$) on the scale 175 is brought opposite the index mark 176. This positions the pin 151 (Fig. 17) at the proper point in the slot 152 in the lever arm 153 to produce the requisite fore and aft shifting movement of the needle and looper mechanism in accordance with said spacing. The adjustment for lateral hole spacing and for the desired stitch group are made by the slide 132 (Figs. 5, 9 and 14) and lever L (Figs. 9, 17, 20 and 24) in the same manner as above described in the case of a two hole button. The shaft 265 (Figs. 30 and 31) is angularly set with the index numeral "2" opposite the reference pin 321, thereby positioning the flattened end portion 303 thereof as shown in Figs. 33 and 34. The machine then operates as above described to sew a group of attaching and tying stitches through the holes $h^1$ and $h^2$. Upon the completion of this stitch group, the cam 129 will have made one complete rotation, but at this time the eccentric 313 permits the bell crank 310, 312 and plunger 311 to assume the positions shown in Fig. 34, so that the bunter 299 is not engaged by the stud 301, and the operation of the machine continues. Also at the completion of the first stitch group and the first rotation of the cam 129, the cam 162 (Figs. 17, 20 and 22) acts, through the slide 156, rock shaft 154, lever arm 153, link 146, arm 149, and rock shaft 150, to shift the needle and looper mechanism rearwardly into position to cooperate with the holes $h^3$ and $h^4$, whereupon a second group of stitches is sewn through the latter holes. Meantime the eccentric 313 has been turned into a position to rock the bell crank 310, 312 and lift the plunger 311 and bunter 299 into the positions shown in Fig. 33. Consequently, upon the completion of the second group of stitches and the second rotation of the cam 129, the stud 301 will engage the bunter 299 and stop the machine as above described.

If it be desired to sew a two hole button with a number of stitches greater than that of any single stitch group for which the machine is designed, the parts may be so adjusted as to sew two groups of stitches through the same pair of holes, each group being completed by the usual tying stitch. For this purpose the locking pin 170 and hand lever 169 (Figs. 15 and 21) are released to position the pin 151 (Fig. 17) concentric with the shaft 154, and the shaft 265 (Figs. 30 and 31) turned to bring the index numeral "2" opposite the reference pin 321, the other adjustments being as above described. The operation of the machine, after depression of the starting treadle, will then be as above described in connection with the sewing of a four hole button except that there will be no fore and aft shifting of the needle and looper mechanism after the completion of the first stitch group and the first rotation of the cam 129, so that both groups of stitches will be sewn through the same pair of holes.

In Figs. 44 and 45 is shown a modification of the adjusting or setting mechanism whereby both the number of groups of stitches and the number of stitches in each group may be determined solely by manipulation of the operating handle 266. In this construction the three-armed lever L of the arrangement first described is replaced by a bell crank lever $L^2$, likewise pivoted at $L^1$ to the machine frame and carrying at the extremities of its arms the forks 139 and 201 for operating the pins 125, 126, and 195, 196, respectively. The shaft 265 has fixed thereon a cam 331 having a raised portion of approximately 90° in length, which cam cooperates with the bifurcated lower end of a lever 332 pivoted intermediate its ends, at 333, to the machine frame. At its upper end the lever 332 carries a pin which is engaged by the bifurcated lower end of one arm of a second bell crank lever 334 likewise pivoted, at 335, to the machine frame. The end of the other arm of the bell crank lever 334 is also bifurcated to engage a pin 336 projecting from a head 337 carried by a slide or plunger 338 guided for vertical movement in the top of the head 71. The head 337 is formed with two arms 339 and 340 the former of which carries at its end a fork 341. This fork corresponds generally to the forked end of the lever 220 (Fig. 39) of the construction first described for shifting the combined gear and clutch member 214 of the change speed gearing connecting the main shaft 76 and cam shaft 78, but in the present instance the gear ratios are such that when the clutch 213 is engaged for the direct drive the shaft 78 is driven from the shaft 76 at a speed ratio of one to eight, and when said clutch is disengaged and the gear 214$^a$ meshed with the gear 219$^a$ the shaft 78 is driven from the shaft 76 at the speed ratio of one to twelve. The arm 340 of the head 337 is connected with that arm of the bell crank lever $L^2$ which carries the fork 139, said connection comprising a stud 342 projecting from the lever arm and engaging a slightly elongated slot 343 in the arm 340, thereby providing for the slight lost motion necessary to permit the movement of the fork 341 required to shift the gear 214$^a$ between its clutch engaging position and its position in mesh with the gear 219$^a$. In this construction, the index characters on the disk 316 comprise the numerals "8", "16", "12" and "24" disposed at 90° to one another in the order named, reading in the clockwise direction.

The parts above described are constructed and arranged to operate as follows. When the numeral "8" on the disk 316 is opposite the index pin 321, as shown in Figs. 44 and 45, the pins 126 and 196 are engaged with the cam grooves 128 and 198 to form the "eight stitch" (i. e., eight vertical needle reciprocations) group, the clutch 213 is engaged for the direct one-to-eight drive, and the shaft 265 is in the position shown in Fig. 35 so as to stop the machine after one rotation of the cam 129 and consequently upon the completion of one "eight stitch" group. When the shaft 265 is turned by the operating handle 266 through an angle of 90° in the counterclockwise direction to bring the numeral "16" opposite the index pin, the positions of the levers 332, $L^2$ and 334 and of the head 337, due to the shape of the cam 331, remain unchanged, so that the pins 126 and 196 remain engaged with the cam grooves 128 and 198 and the clutch 213 remains engaged for the one-to-eight drive, but the end portion 303 of the shaft 265 assumes the position shown in Figs. 33 and 34, so that the machine is not stopped until after the completion of two "eight stitch" groups. When the shaft 265 is turned through a further angle of 90° to bring the numeral "12" opposite the index pin, the cam 331, acting through the levers 332 and 334, lowers the head 337 and rocks the bell crank lever $L^2$ in the counterclockwise direction, thereby disengaging the clutch 213 and intermeshing the gears 214$^a$ and 219$^a$ for the one-to-twelve drive, and disengaging the pins 126 and 196 from the cam grooves 128 and 198 and engaging the pins 125 and 195 with the cam grooves 127 and 197 to form a "twelve stitch" group, said shaft 265 again assuming the position shown in Fig. 35, so that the machine is stopped after the completion of one such stitch group. When the numeral "24" is brought opposite the index pin, the setting of the gear 214$^a$ and of the pins 125 and 195 remains unchanged, but the shaft 265 is turned into the position shown in Figs. 33 and 34, so that the machine is stopped after the completion of two "twelve stitch" groups.

We claim:

1. In a sewing machine, stitch forming elements, means for operating the same to form stitches, and means for shifting said elements from one stitching position to another after the formation of a predetermined number of stitches in each of said positions, said machine having provision for varying the number of stitches formed in each of said positions between shifting movements.

2. In a sewing machine, stitch forming elements, means for operating the same to form stitches, and means for shifting said elements from one stitching position to another after the formation of a predetermined number of stitches in each of said positions, said operating means including alternatively operative portions adapted respectively to produce different numbers of stitches in each of said positions between shifting movements.

3. In a machine for sewing on buttons, stitch forming mechanism including a needle and operating mechanism therefor including means for reciprocating said needle longitudinally, means for vibrating said needle laterally in one direction, and means for moving said needle laterally in a direction transverse to said first named direction between groups of a predetermined number of longitudinal reciprocations thereof, said mechanism having provision for varying the number of longitudinal reciprocations of said needle intervening between successive movements thereof in said last named direction.

4. In a machine for sewing on buttons, stitch forming mechanism including a needle and operating mechanism therefor including means for reciprocating said needle longitudinally, means for vibrating said needle laterally in one direction, and means for moving said needle laterally in a direction transverse to said first named direction between groups of a predetermined number of longitudinal reciprocations thereof, said mechanism including a plurality of alternatively operative actuating devices adapted respectively to produce different numbers of longitudinal reciprocations of said needle in each of said groups.

5. In a machine for sewing on buttons, a needle, cooperating looper elements, means for reciprocating said needle longitudinally, means for vibrating it laterally, said vibrating means being adjustable to vary the amplitude of vibration, means for oscillating said looper elements, said oscillating means being adjustable to vary the amplitude of oscillation, and common means for simultaneously adjusting said vibrating means and oscillating means.

6. In a machine for sewing on buttons, stitch forming mechanism including a needle and co-operating looper elements, means for reciprocating said needle longitudinally to cause the same to penetrate the work, mechanism for moving said needle laterally in two directions transverse to each other, mechanism for oscillating said looper elements to cause them to cooperate with the needle when the latter is reciprocated and moved laterally in one of said directions and for shifting the position of said looper elements to maintain the cooperative relationship when said needle is moved laterally in the other of said directions, and means whereby the amplitude of oscillation of the looper elements and of said first named lateral movement of the needle may be simultaneously and correspondingly varied.

7. In a machine for sewing on buttons, stitch-forming mechanism, operating mechanism therefor including a controlling element having a cycle of operation to cause the formation of a group of stitches of a predetermined number, means whereby said number may be varied, and means adapted to be operated by said controlling element at the completion of each cycle of operation thereof to stop the machine, said parts being adjustable to cause stopping of the machine after the completion of a variable number of cycles of operation of said element.

8. In a machine for sewing on buttons, stitch-forming mechanism, operating mechanism therefor including a plurality of actuating devices adapted respectively to produce complete stitch-forming cycles of a different number of stitches each, means whereby said devices may be rendered selectively operative, and means adapted to be operated at the completion of each of said stitch-forming cycles to stop the machine, said last named means being adjustable to cause stopping of the machine after the completion of a variable number of stitch-forming cycles, whereby said machine may be set to form automatically a variable number of groups of stitches of a variable number of stitches each.

9. In a machine for sewing on buttons, stitch-forming mechanism having a cycle of operation to form a group of stitches of a predetermined number, adjusting means whereby said number may be varied, and means adapted to be operated at the completion of a cycle of operation of said stitch-forming mechanism to stop the machine and adjustable to cause stopping of the machine after the completion of a variable number of cycles, whereby said machine may be set to form automatically a variable number of groups of stitches of a variable number of stitches each.

10. In a machine for sewing on buttons, stitch-forming mechanism having a cycle of operation to form a group of stitches comprising a predetermined number of attaching stitches and a tying stitch, adjusting means whereby the number of attaching stitches in said group may be varied, and means adapted to be operated at the completion of a cycle of operation of said stitch-forming mechanism to stop the machine and adjustable to cause stopping of the machine after the completion of a variable number of cycles, whereby said machine may be set to form automatically a variable number of groups of stitches of a variable number of attaching stitches each.

11. In a machine for sewing on buttons, stitch-forming mechanism, means for operating the same in cycles of a predetermined number of stitches each, said means being adjustable to vary the number of stitches in each cycle, and means for stopping the machine at the completion of a cycle, said stopping means being adjustable to vary the number of cycles performed before stopping, whereby the number of cycles and the number of stitches in each cycle may be determined.

12. In a machine for sewing on buttons, stitch-forming mechanism, means for operating the same in cycles each comprising a predetermined number of consecutive attaching stitches followed by a tying stitch, said means being adjustable to vary the number of attaching stitches in each cycle, and means for stopping the machine at the completion of a cycle, said stopping means being adjustable to vary the number of cycles performed before stopping, whereby the number of cycle and the number of stitches in each cycle may be determined.

13. In a machine for sewing on buttons, stitch-forming mechanism, means for operating the same in cycles of a predetermined number of stitches each, said means being adjustable to vary the number of stitches in each cycle, means for stopping the machine at the completion of a cycle, said stopping means being adjustable to vary the number of cycles performed before stopping, and common means for simultaneously adjusting said operating means and stopping means, whereby the number of cycles and the number of stitches in each cycle may be determined.

14. In a machine for sewing on buttons, stitch-forming mechanism, mechanism for operating the same including an actuating and controlling member having a definite range of movement in the production of a stitch forming cycle of a predetermined number of stitches, said mechanism being adjustable to vary the number of stitches in the cycle produced during said range of movement, means for stopping the machine at the completion of a cycle, said stopping means being adjustable to vary the number of cycles performed before stopping, and common means for simultaneously adjusting said operating mechanism and stopping means.

15. In a machine for sewing on buttons, a needle, cooperating looper elements, a shaft having means for actuating said needle, a second shaft having means for actuating said looper elements, said second shaft having a definite angular movement to produce a stitch-forming cycle of a predetermined number of stitches, said looper actuating means being adjustable to vary the number of stitches in said cycle, adjustable means for driving said shafts at a variable relative speed, means for stopping the machine at the completion of a cycle, said stopping means being adjustable to vary the number of cycles performed before stopping, and common means for simultaneously adjusting said looper actuating means, driving means, and stopping means and thereby vary the number of stitch-forming cycles and the number of stitches in each cycle.

16. In a machine for sewing on buttons, a needle, cooperating looper elements, a shaft having means for reciprocating said needle longitudinally, a second shaft having means for vibrating said needle laterally and means for actuating said looper elements in synchronism with the lateral vibrations of said needle, said second shaft having a definite angular movement to produce a stitch-forming cycle of a predetermined number of stitches, said needle vibrating means and looper actuating means being adjustable to vary the number of stitches in said cycle, adjustable means for driving said shafts at a variable relative speed, means for stopping the machine at the completion of a cycle, said stopping means being adjustable to vary the number of cycles performed before stopping, and common means for simultaneously adjusting said needle vibrating means, looper actuating means, driving means, and stopping means and thereby vary the number of stitch-forming cycles and the number of stitches in each cycle.

17. In a machine for sewing on buttons, stitch-forming mechanism, mechanism for operating the same including an actuating and controlling member having a definite range of movement in the production of a stitch forming cycle of a predetermined number of stitches, said mechanism being adjustable to vary the number of stitches in the cycle produced during said range of movement, and means for stopping the machine at the completion of a cycle, said stopping means being adjustable to vary the number of cycles performed before stopping.

18. In a machine for sewing on buttons, a needle, cooperating looper elements, a shaft having means for actuating said needle, a second shaft having means for actuating said looper elements, said second shaft having a definite angular movement in the performance of a stitch-forming cycle of a predetermined number of stitches, adjustable means to vary the number of stitches produced during said angular movement, adjustable means for driving said shafts at a variable relative speed, and means for stopping the machine at the completion of a cycle, said stopping means being adjustable to vary the number of cycles performed before stopping.

19. In a machine for sewing on buttons, a needle, cooperating looper elements, a shaft having means for reciproating said needle longitudinally, a second shaft having means for vibrating said needle laterally and means for actuating said looper elements in synchronism with the lateral vibrations of the needle, said second shaft having a definite angular movement in the performance of a stitch-forming cycle of a predetermined number of stitches, adjustable means to vary the number of lateral vibrations of said needle and operations of said looper elements during said angular movement, adjustable means for driving said shafts at a variable relative speed, and means for stopping the machine at the completion of a cycle, said stopping means being adjustable to vary the number of cycles performed before stopping.

20. In a machine for sewing on buttons, stitch-forming mechanism, operating mechanism therefor including a controlling element having a cycle of operation to cause said stitch forming mechanism to form a group of stitches of a predetermined number, an actuating member movable with said controlling element, stop mechanism having an operating member adapted to be engaged by said actuating member to stop the machine at the completion of a cycle of operation of said controlling element, and manually operated means whereby said operating member may be positioned in or out of the path of movement of said actuating member.

21. In a machine for sewing on buttons, stitch-forming mechanism, operating mechanism therefor including a controlling element having a cycle of operation to cause said stitch-forming mechanism to form a group of stitches of a predetermined number, means adapted to be operated by said element at the completion of each cycle of operation thereof to stop the machine, means whereby said stopping means may be rendered inoperative to stop the machine at the completion of one cycle of operation, and means for automatically rendering said stopping means operative to stop the machine at the completion of a subsequent cycle.

22. In a machine for sewing on buttons, stitch-forming mechanism, operating mechanism therefor including a controlling element having a cycle of operation to cause said stitch-forming mechanism to form a group of stitches of a predetermined number, an actuating member movable with said controlling element, stop mechanism having an operating member adapted to be engaged by said actuating member to stop the machine at the completion of a cycle of operation of said controlling element, manually operated means whereby said operating member may be positioned in or out of the path of movement of said actuating member, and means for automatically moving said operating member into said path, when not positioned therein, after the completion of a cycle of operation of said controlling member.

23. In a machine for sewing on buttons, stitch-forming mechanism, operating mechanism therefor including a rotary cam adapted, during each rotation thereof, to cause said stitch-forming mechanism to form a group of stitches of a predetermined number, said cam having a projection, stop mechanism, an operating bunter therefor adapted to be positioned in the path of movement of said projection and when so positioned to be engaged thereby upon the completion of each rotation of said cam, manually operated means for positioning said bunter in or out of said path, and automatic means for moving said bunter into said path, when not positioned therein, after the completion of a rotation of said cam.

24. In a machine for sewing on buttons, stitch-forming devices and actuating and controlling mechanism therefor adapted to cause the same to form automatically a plurality of groups of consecutive attaching stitches of a predetermined number each, said mechanism including means for causing said devices to form a tying stitch at the completion of each group of attaching stitches, and means for varying the number of stitches in each group.

25. In a machine for sewing on buttons, stitch-forming devices and actuating and controlling mechanism therefor adapted to cause the same to form automatically a plurality of groups of attaching stitches of a predetermined number each, said mechanism including means for causing said devices to form a tying stitch at the completion of each group of attaching stitches, means for varying the number of groups of stitches formed, and means for varying the number of stitches in each group.

26. In a machine for sewing on buttons, stitch forming mechanism including a needle longitudinally reciprocable to penetrate the work and laterally movable in two directions transverse to each other, and a work-supporting throat plate having an opening through which said needle passes, said throat plate being movable laterally with said needle in at least one of said directions.

27. In a machine for sewing on buttons, stitch forming mechanism including a needle longitudinally reciprocable to penetrate the work and laterally movable in two directions transverse to each other, and a work-supporting throat plate having an opening through which said needle passes and of a size sufficient to permit the lateral movement of the needle in one of said directions, said throat plate being movable laterally with said needle in the other of said directions.

28. In a sewing machine, stitch-forming elements, means for operating the same to form stitches, and means for shifting said elements from one stitching position to another after the formation of a predetermined number of stitches in the first position to form a like number of stitches in the other position, said machine having provision for varying the number of stitches formed in each of said positions.

29. In a sewing machine, stitch-forming elements, means for operating the same to form stitches, and means for shifting said elements from one stitching position to another after the formation of a predetermined number of stitches in the first position to form a like number of stitches in the other position, said operating means including alternatively operative portions adapted respectively to produce different numbers of stitches formed in each of said positions.

FRANKLIN A. REECE.
SAMUEL W. AVIS.